US011341435B2

(12) United States Patent
van Ryzin et al.

(10) Patent No.: US 11,341,435 B2
(45) Date of Patent: May 24, 2022

(54) SYSTEMS AND METHODS FOR QUEUEING IN DYNAMIC TRANSPORTATION NETWORKS

(71) Applicant: Lyft, Inc., San Francisco, CA (US)

(72) Inventors: Garrett van Ryzin, Brooklyn, NY (US); Jianzhe Luo, Bellevue, WA (US); Christopher Sholley, San Francisco, CA (US); Adam Greenhall, Seattle, WA (US); Jeremy Alexander Karp, San Francisco, CA (US)

(73) Assignee: Lyft, Inc., San Francisco, CA (US)

( * ) Notice: Subject to any disclaimer, the term of this patent is extended or adjusted under 35 U.S.C. 154(b) by 612 days.

(21) Appl. No.: 16/024,451

(22) Filed: Jun. 29, 2018

(65) Prior Publication Data

US 2020/0005206 A1 Jan. 2, 2020

(51) Int. Cl.
*G06Q 10/06* (2012.01)

(52) U.S. Cl.
CPC ... *G06Q 10/06311* (2013.01); *G06Q 2240/00* (2013.01)

(58) Field of Classification Search
None
See application file for complete search history.

(56) References Cited

U.S. PATENT DOCUMENTS

| 2013/0246207 A1* | 9/2013 | Novak | G06Q 30/0641 |
| | | | 705/26.2 |
| 2017/0293950 A1* | 10/2017 | Rathod | G06Q 30/0639 |
| 2017/0300049 A1* | 10/2017 | Seally | G06Q 10/047 |
| 2018/0012160 A1* | 1/2018 | Yao | G06Q 10/04 |
| 2019/0096251 A1* | 3/2019 | O'Sullivan | G06Q 10/00 |

OTHER PUBLICATIONS

Hoque et al, SAFARI-Taxi: Secure, Autonomic, FAult-Resilient, and Intelligent Taxi Hailing System (Year: 2017).*

* cited by examiner

*Primary Examiner* — Mohamed N El-Bathy
(74) *Attorney, Agent, or Firm* — FisherBroyles LLP

(57) ABSTRACT

The disclosed computer-implemented method may include matching transportation requests to transportation providers using a dynamic transportation matching system. Matching transportation requestors which have varying preferences for waiting times and transportation pricing with transportation providers having varying levels of available supply may involve matching methods that satisfy the transportation requestors while maintaining an appropriate level of supply. A method which provides immediate service for transportation requestors that may be willing to pay a premium fare while placing transportation requestors not willing to pay a premium fare and may be willing to wait may provide a balance of supply and demand of transportation providers. Accordingly, immediately matching transportation requestors not willing to wait while placing the transportation requestors willing to wait in a queue may provide the balanced approach to managing transportation provider availability. Other methods, systems, and computer-readable media are disclosed.

20 Claims, 18 Drawing Sheets

SYSTEMS AND METHODS FOR QUEUEING IN DYNAMIC TRANSPORTATION NETWORKS

BACKGROUND

Some transportation services may provide transportation on demand, drawing from a transportation provider supply pool to meet the needs of those requesting transportation services as the needs arise. However, immediately matching all requests with available transportation providers may result in wasted transportation supply resources, an unacceptable fluctuation in the level of available transportation providers, increased transportation time, and/or other suboptimal results. For example, a transportation service may experience a burst of on-demand requests that decreases the level of available transportation providers below a desired level, thereby resulting in delays in providing the transportation services for future requests. The performance of an on-demand transportation service may depend on prompt matching of transportation requests to transportation providers. Accordingly, decisions about when and how to match transportation requests may pose costly trade-offs for on-demand transportation services and consumers of on-demand transportation services.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1A:
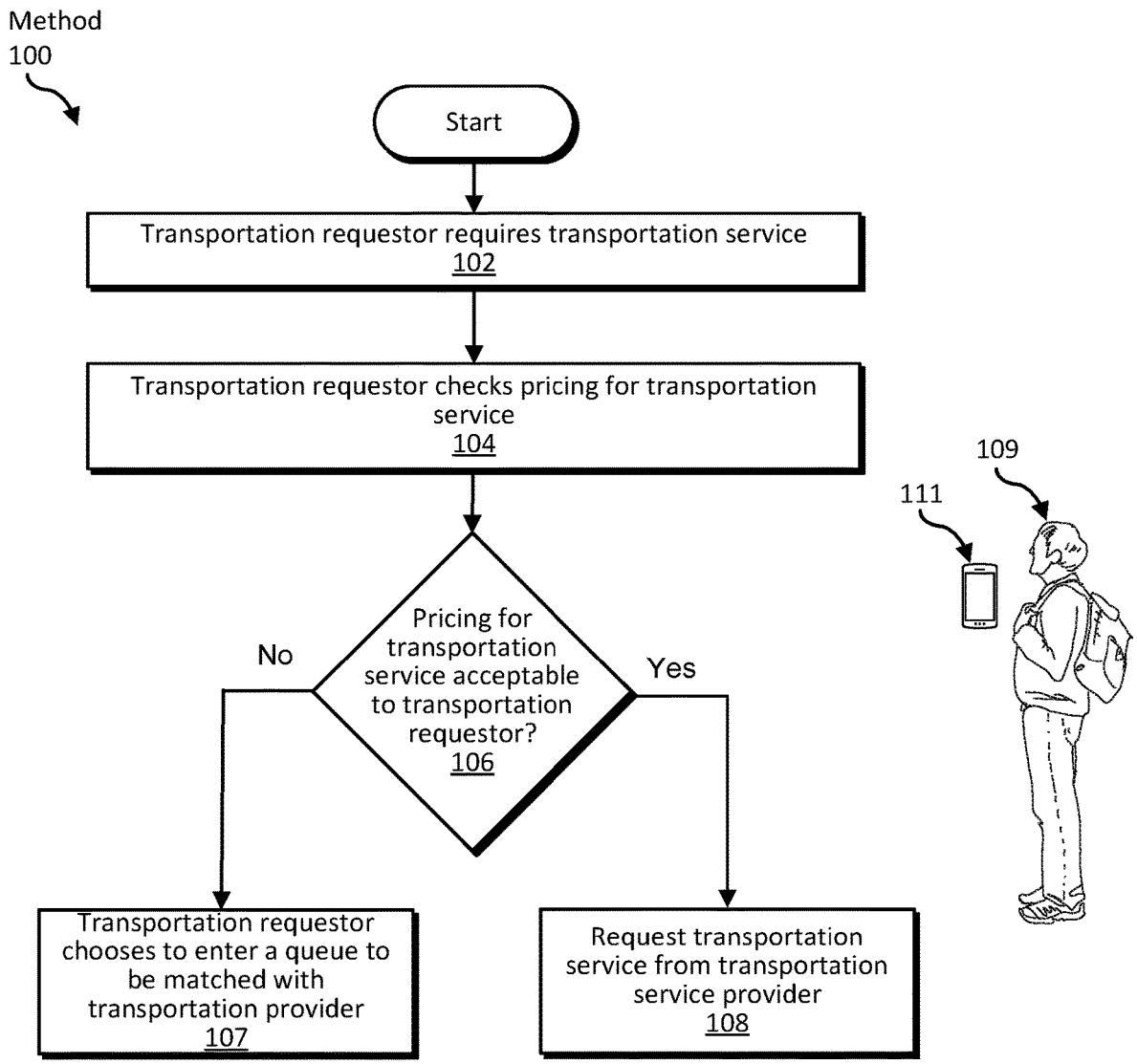
FIG. 1a is a flowchart of an example method of requesting a transportation service in a dynamic transportation network.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to matching transportation requests (e.g., to a dynamic transportation matching system) to transportation providers using a matching system. Matching decisions between transportation requestors and transportation providers during times of high demand for transportation services may pose tradeoffs between maintaining an acceptable level of available transportation providers and managing the time a transportation requestor must wait for transportation when transportation demand is higher than transportation provider supply.

Transportation requestors may have varying needs in terms of the amount of time the transportation requestor is willing to wait for transportation and the amount they may be willing to pay for the transportation. In addition, a transportation network may have times of high transportation demand and a limited supply of transportation providers. During times of limited transportation provider supply, some transportation requestors require immediate transport and may be willing to pay a premium fare in order to receive transportation in a timely fashion. Other transportation requestors may be unwilling to pay a premium fare and may be willing to wait for transportation service when the transportation provider supply has increased.

As will be explained in greater detail below, matching transportation requestors which have varying preferences for waiting times and transportation pricing with transportation providers having varying levels of available supply may involve matching methods that satisfy the transportation requestors while maintaining an appropriate level of supply. In some examples, as will be discussed in greater detail below, a method which provides immediate service for transportation requestors that may be willing to pay a premium fare and cannot wait while placing transportation requestors not willing to pay a premium fare and may be willing to wait can provide a better balance of supply and demand of transportation providers. In some examples, immediately servicing transportation requestors not willing to wait while placing the transportation requestors willing to wait in a queue may provide the balanced approach to managing transportation provider availability. In some examples, during times of high transportation demand a fare may be increased to a premium fare and a transportation matching system may provide transportation requestors with an option to accept a premium fare for on-demand matching or to join a queue to await a matching process.

Accordingly, as may be appreciated, the systems and methods described herein may improve the functioning of a computer that implements dynamic transportation matching. For example, these systems and methods may improve the functioning of the computer by improving dynamic transportation matching results. Additionally or alternatively, these systems and methods may improve the functioning of the computer by reducing the computing resources consumed to identify appropriate transportation matchings (and, e.g., thereby freeing computing resources for other tasks, such as those directly and/or indirectly involved in dynamic transportation matching). In some examples, these systems and methods may improve the functioning of a computer by reducing repeated transportation request queries from a requestor device (e.g., which may otherwise be submitted by potential transportation requestors who would monitor price fluctuations in the absence of a queue).

Furthermore, for the reasons mentioned above and to be discussed in greater detail below, the systems and methods described herein may provide advantages to field of dynamic transportation management and/or the field of transportation. In addition, these systems and methods may provide advantages to vehicles (whether piloted by a human driver or autonomous) that operate as a part of a dynamic transportation network. For example, the vehicles may complete transportation tasks more quickly, more efficiently (e.g., in terms of fuel, vehicle wear, etc.), and/or more safely (e.g., by driving, on average, shorter distances to complete the same transportation objective).

In some examples, transportation requestors that may be unwilling to pay a premium fare for transportation, but have flexibility and may be willing to wait for transportation, may frequently access a dynamic transportation network application to determine when a transportation fare has returned to a non-premium or base fare. When transportation pricing has returned to a base fare, a sudden surge of transportation demand may occur which causes an increased demand on the transportation supply. The dynamic transportation system may specify a minimum, average, maximum, or other target level of supply of transportation providers to remain available to service transportation requestors willing to pay the premium fare and the surge in demand may cause the dynamic transportation system to be unable to match the increased transportation requests. The high variability in demand due to the turning on and off of premium-fare pricing may create an instability in the dynamic transportation network. In addition, in some embodiments, a problem may arise when certain transportation providers are matched with premium fare transportation requests in a disproportionate amount as compared to other transportation providers resulting in uneven compensation among the transportation providers. Accordingly, in some embodiments, the methods of the present disclosure may ensure an appropriate level of available transportation providers while maximizing transportation service to transportation requestors and regularizing the compensation to the transportation providers.

FIG. 1a is a flowchart of an example method of requesting a transportation service in a dynamic transportation network. As shown in FIG. 1, a method 100 may include, at step 102, a transportation requestor 109 requiring a transportation service. For example, the transportation service may be provided by a ridesharing service, a ridesourcing service, a taxicab service, a car-booking service, an autonomous vehicle service, or some combination and/or derivative thereof. The transportation requestor 109 may request the transportation service in a variety of ways, including by using an application running on an electronic device 111 (e.g., a smartphone) to request the transportation service. At step 104, the transportation requestor 109 may use the application to check the fare associated with the requested transportation service. In one example, the fare may be a premium fare which may be higher than a base fare. In this example, the premium fare may be higher than the base fare due to high demand for transportation services within the geographic area of the transportation requestor 109. At step 106, the transportation requestor 109 may decide whether the fare is acceptable. If the fare is not acceptable (e.g., the fare is a premium fare and unacceptable to the requestor), at step 107, the transportation requestor 109 may choose to enter a queue to be matched with a transportation provider. The transportation requestor 109 may wait in the queue until the transportation requestor is matched to a transportation provider. In some examples, the transportation requestor may be matched with another transportation requestor to share a transportation service. If the fare is acceptable, the transportation requestor 109 may request the transportation service from the transportation provider in step 108. As may be appreciated, without the advantages of being able to enter a queue to be matched with a transportation provider, the transportation requestor 109 may expend time and focus while attempting to secure transport at an acceptable fare, potentially leading to a frustrating user experience.

Figure 1B:
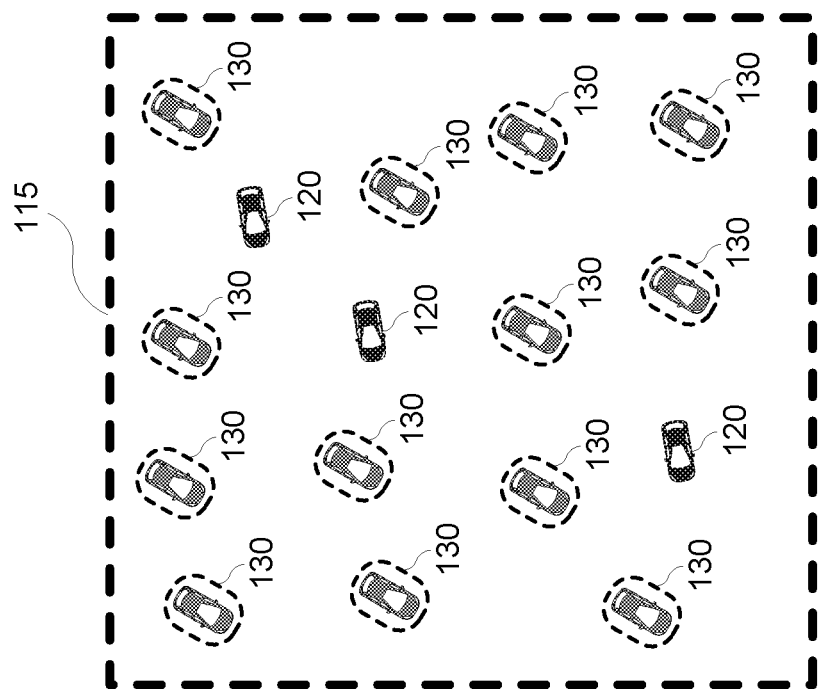
FIG. 1b is an illustration of low transportation provider supply and high transportation requestor demand in a dynamic transportation network.
Figure 1B:
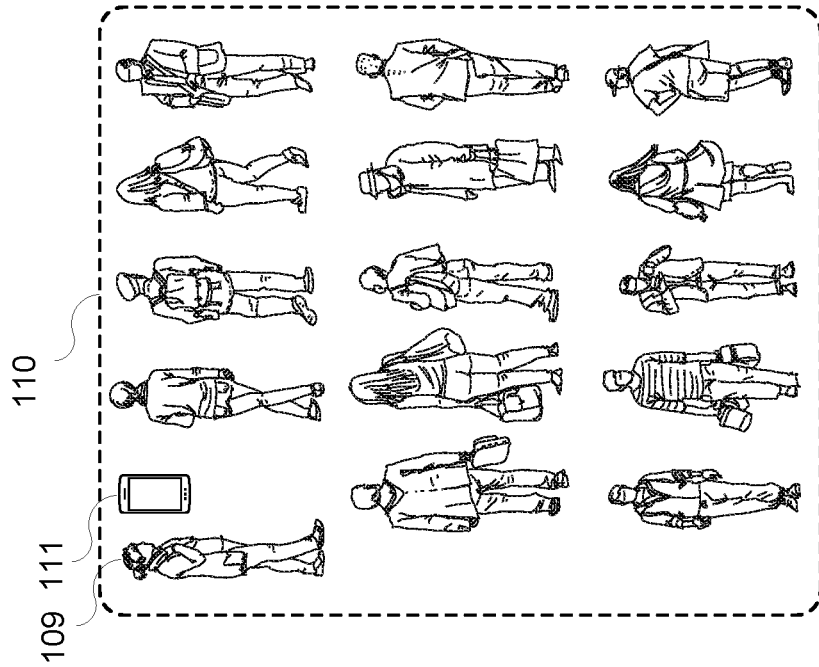

FIG. 1b is an illustration of low transportation provider supply and high transportation requestor demand in a dynamic transportation network. As shown in FIG. 1b, a dynamic transportation network may include a set of transportation requestors 110 and a set of transportation providers 115. Transportation requestor 109 of the set of transportation requestors 110 may request a transportation service using electronic device 111 (e.g., smart phone). The set of transportation providers may include available transportation providers 120 and unavailable transportation providers 130. The available transportation providers 120 may be available to provide transportation to one or more transportation requestors. The unavailable transportation providers 130, in contrast, may be unavailable to provide transportation to the transportation requestors. For example, the unavailable transportation providers 130 may be unavailable due to providing transportation to other transportation requestors. The lack of a sufficient number of available transportation providers 120 to service the transportation requestors 110 may result in a dynamic transportation matching system increasing fares from a base level to a premium level.

Figure 1C:
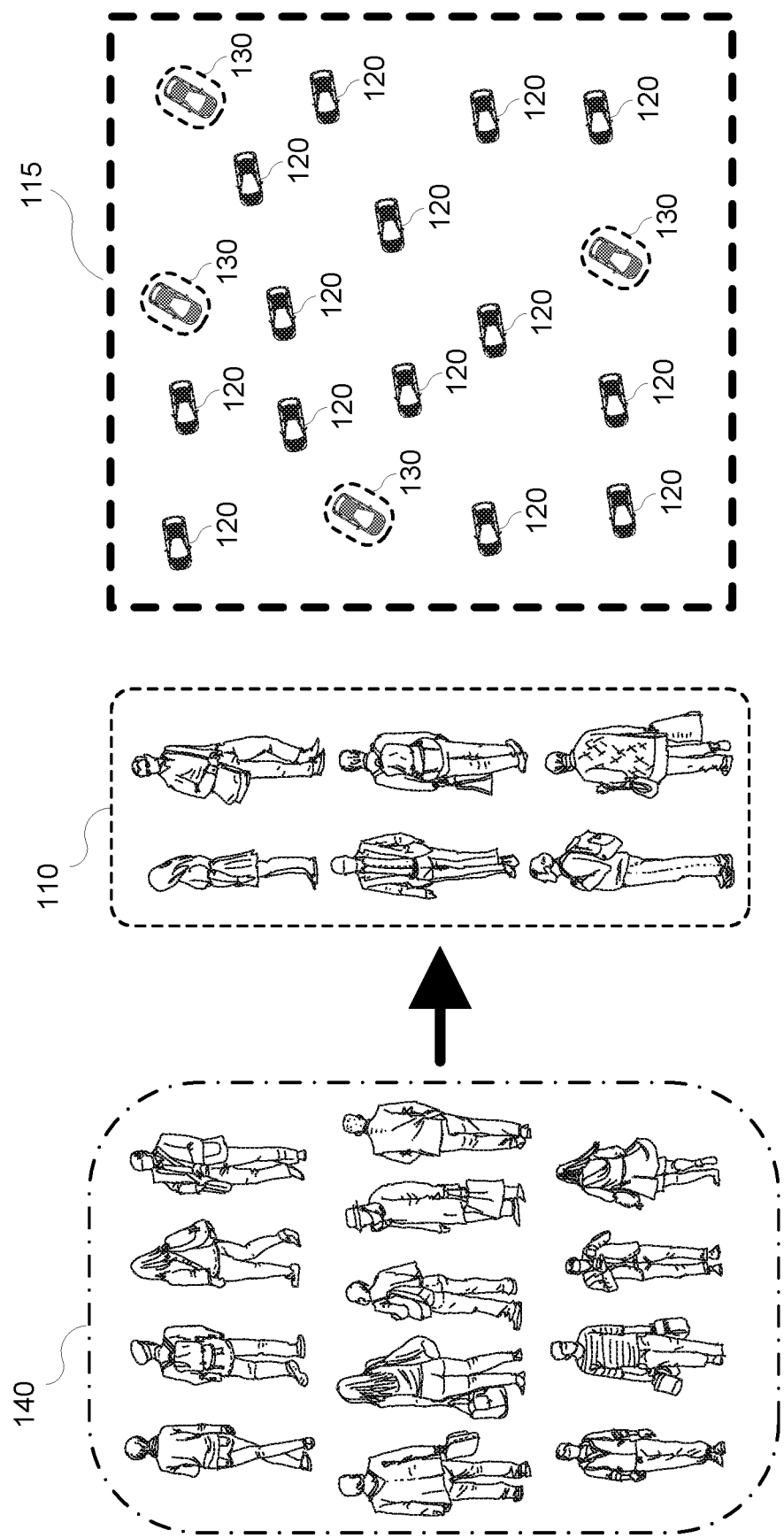
FIG. 1c is an illustration of high transportation provider supply and an increase in transportation requestor demand in a dynamic transportation network.

FIG. 1c is an illustration of high transportation supply and a sudden increase in transportation demand in a dynamic transportation network. As shown in FIG. 1c, a dynamic transportation network may include a set of transportation requestors 110, a new set of transportation requestors 140, and a set of transportation providers 115. The set of transportation providers may include available transportation providers 120 and unavailable transportation providers 130. In one example, the level (e.g., number) of available transportation providers 120 may be sufficient to service the set of transportation requestors 110. However, if there is a sudden increase in the number of transportation requestors (for example, if a new set of transportation requestors 140 suddenly joins the set of transportation requestors 110), the level of available transportation providers 120 may be insufficient to service the increased number of transportation requestors.

Figure 1D:
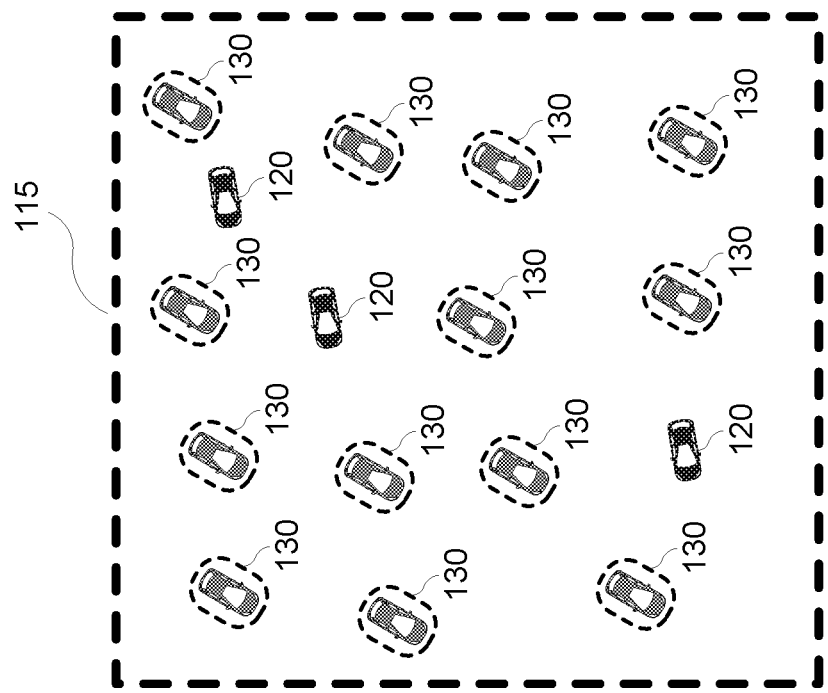
FIG. 1d is an illustration of low transportation provider supply after an increase in transportation requestor demand in a dynamic transportation network.
Figure 1D:
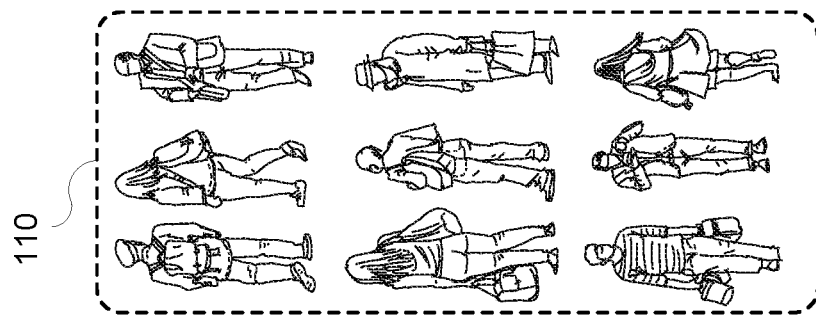

FIG. 1*d* is an illustration of low transportation supply after an increase in transportation demand in a dynamic transportation network. As shown in FIG. 1*d*, a dynamic transportation network may include a set of transportation requestors 110 and a set of transportation providers 115. The set of transportation providers may include available transportation providers 120 and unavailable transportation providers 130. FIG. 1*d* shows the decrease in the level of available transportation providers 120 as a result of the sudden increase in transportation requestors, as described above in FIG. 1*c*.

Figure 2A:
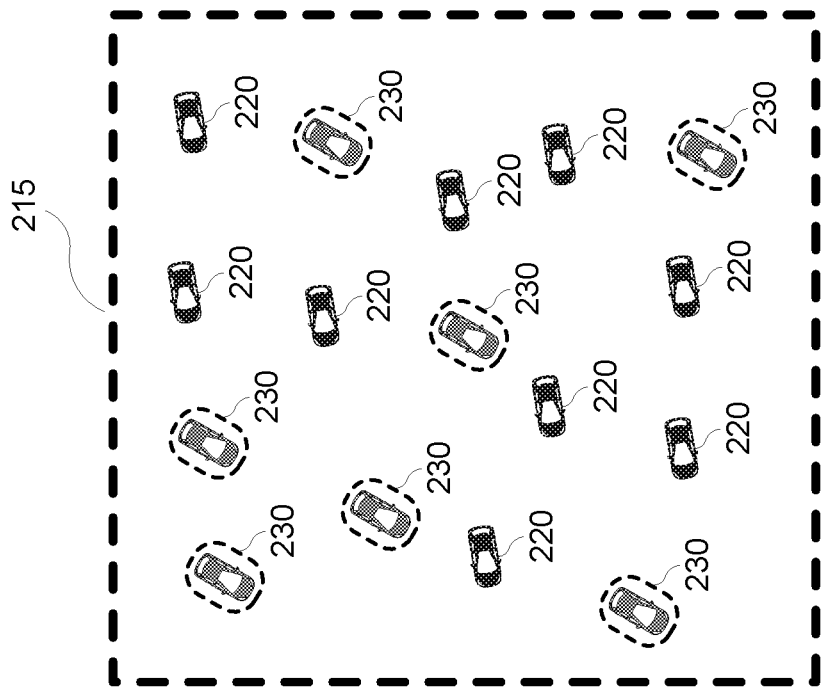
FIG. 2a is an illustration of stable transportation provider supply and high transportation requestor demand in a dynamic transportation network.
Figure 2A:
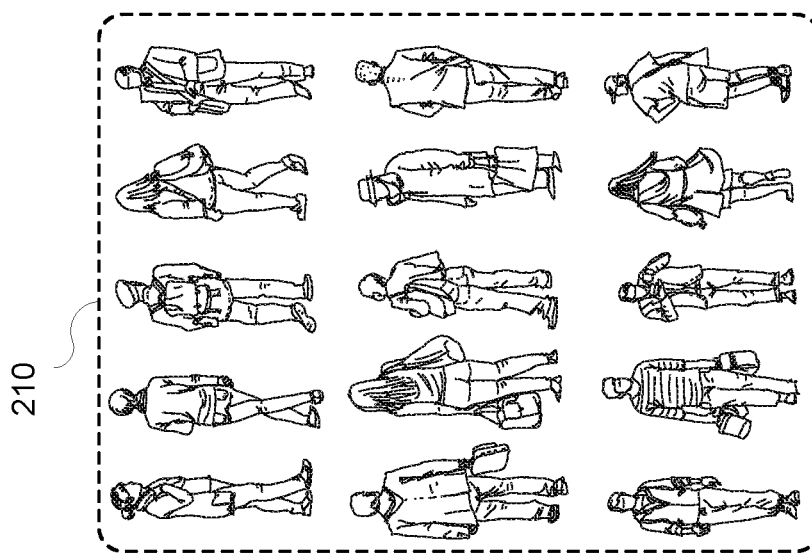

FIG. 2*a* is an illustration of stable transportation provider supply and high transportation requestor demand in a dynamic transportation network. As shown in FIG. 2*a*, a dynamic transportation network may include a set of transportation requestors 210 and a set of transportation providers 215. The set of transportation providers may include available transportation providers 220 and unavailable transportation providers 230. The available transportation providers 220 may be available to provide transportation to one or more transportation requestors. The unavailable transportation providers 230 may, in contrast, be unavailable to provide transportation to the transportation requestors. In this example, the level of available transportation providers 220 is higher than the level shown in FIG. 1*b*. The level of available transportation providers 220 may be a more stable and higher level than the level shown in FIG. 1*b* due to the method of placing transportation requestors willing to wait for transportation service into a queue while immediately servicing transportation requestors unwilling to wait for transportation service.

Figure 2B:
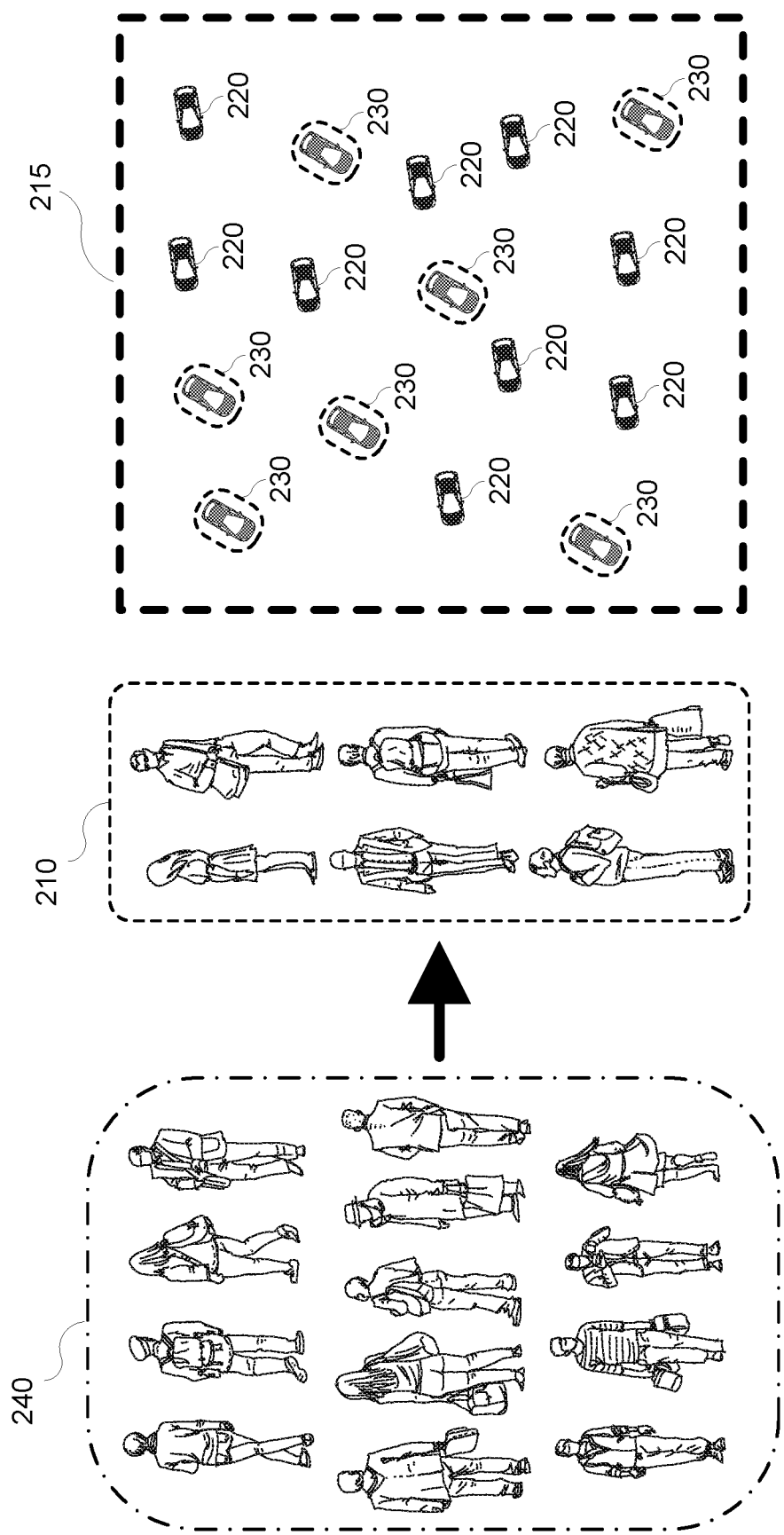
FIG. 2b is an illustration of stable transportation provider supply and an increase in transportation requestor demand in a dynamic transportation network.

FIG. 2*b* is an illustration of stable transportation provider supply and an increase in transportation requestor demand in a dynamic transportation network. As shown in FIG. 2*b*, a dynamic transportation network may include a set of transportation requestors 210, a new set of transportation requestors 240, and a set of transportation providers 215. The set of transportation providers may include available transportation providers 220 and unavailable transportation providers 230. The available transportation providers 220 may be available to provide transportation to one or more transportation requestors. The unavailable transportation providers 230 may, in contrast, be unavailable to provide transportation to the transportation requestors. If there is a sudden increase in the number of transportation requestors (for example, if a new set of transportation requestors 240 joins the set of transportation requestors 210), the level of available transportation providers 220 may be higher than the level shown in FIG. 1*c*. In one example, the level of available transportation providers 220 may be a more stable and higher level after a sudden increase in new transportation requestors 240 than the level shown in FIG. 1*c* due to the method of placing transportation requestors willing to wait for transportation service into a queue while immediately servicing transportation requestors unwilling to wait for transportation service.

Figure 2C:
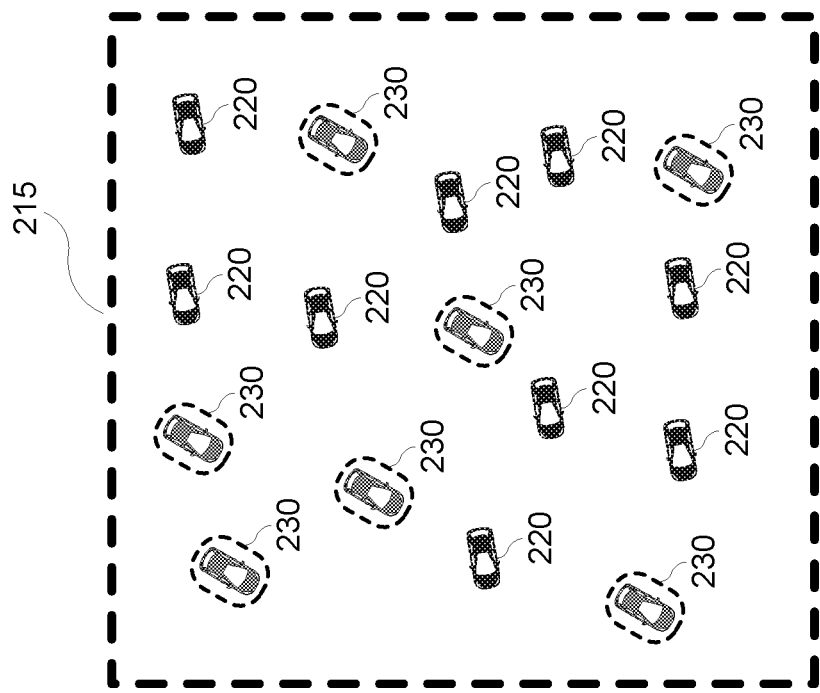
FIG. 2c is an illustration of stable transportation provider supply after an increase in transportation requestor demand in a dynamic transportation network.
Figure 2C:
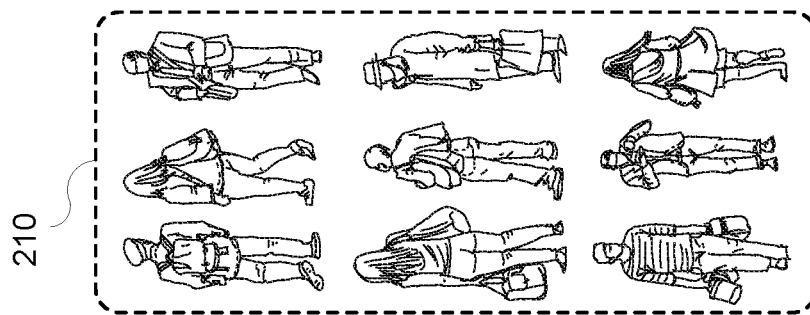

FIG. 2*c* is an illustration of stable transportation provider supply after an increase in transportation requestor demand in a dynamic transportation network. As shown in FIG. 2*c*, a dynamic transportation network may include a set of transportation requestors 210 and a set of transportation providers 215. The set of transportation providers may include available transportation providers 220 and unavailable transportation providers 230. FIG. 2*c* shows the stable level of available transportation providers 220 after the sudden increase in transportation requestors as described above in FIG. 2*b*. In one example, the level of available transportation providers 220 may be a more stable and higher level after a sudden increase in new transportation requestors 240 than the level shown in FIG. 1*d* due to the method of placing transportation requestors willing to wait for transportation service into a queue while immediately servicing transportation requestors unwilling to wait for transportation service.

Figure 3:
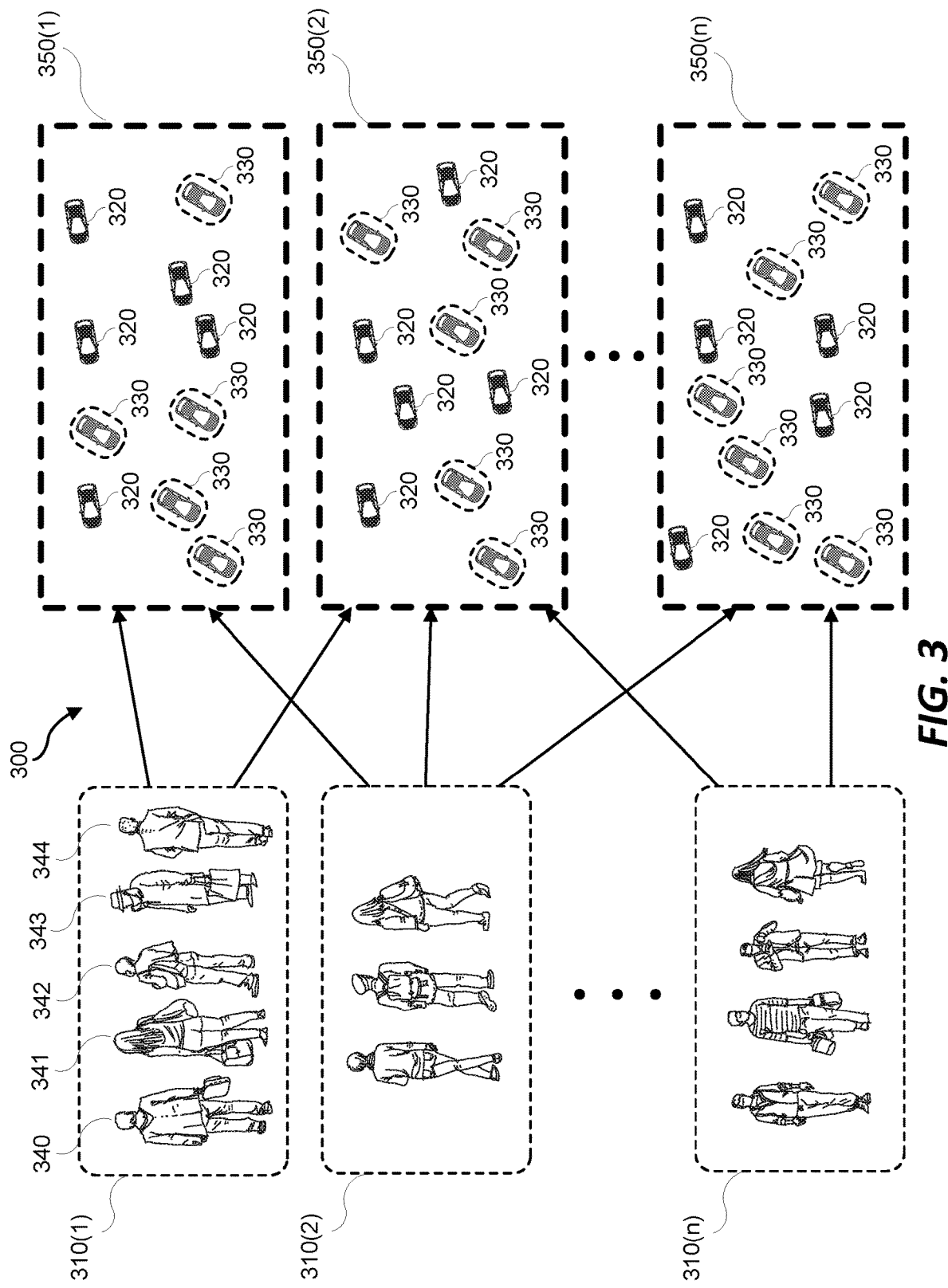
FIG. 3 is an illustration of an example method of queueing transportation requests in a dynamic transportation network.

FIG. 3 is an illustration of an example method of queueing transportation requests in a dynamic transportation network. As shown in FIG. 3, a dynamic transportation network 300 may include multiple transportation request queues 310(1)-(*n*) and corresponding sets of transportation providers 350 (1)-(*n*). Each of the sets of transportation providers 350(1)-(*n*) may include available transportation providers 320 and unavailable transportation providers 330. Each of the sets of transportation request queues 310(1)-(*n*) may include transportation requestors. An example set of transportation requestors 340, 341, 342, 343, and 344 is shown in transportation request queue 310(1). Each of the sets of transportation request queues 310(1)-(*n*) may represent transportation requestors in a corresponding geographic area. Each of the geographic areas may defined by a geohash grid, a geofenced area, a neighborhood, a town, a region, zip code, etc. In addition, each of the sets of transportation providers 350(1)-(*n*) may represent transportation providers in corresponding geographic areas. In some examples, one or more of the geographic areas for transportation providers may overlap with adjacent geographic areas. Likewise, one or more of the geographic areas representing the transportation requestors may overlap with adjacent geographic areas. In some examples, transportation providers in a geographic area may be matched with transportation requestors that are in a different geographic area. For example, a transportation provider in the set of transportation providers 350(1) may be matched to a transportation requestor in set of transportation requestors 310(2). Matching transportation providers with transportation requestors that are in a different geographic area may reduce the waiting time for transportation requestors. In addition, matching transportation providers with transportation requestors that are in a different geographic area may reduce the average ETA for the dynamic transportation network and may contribute to maintaining an acceptable level of available transportation providers.

In some examples, when transportation requestor 340 chooses to enter the transportation request queue and wait for transportation matching instead of requesting to be matched with an available transportation provider when the transportation requestor submits the transportation request, a dynamic transportation matching system may place the transportation request in transportation queue 310(1) along with transportation requests 341, 342, 343, and 344. When the transportation requestor chooses to be placed in the queue, the transportation requestor may receive information indicating the queue length and the expected waiting time in the queue. The dynamic transportation matching system may determine which transportation requestors to select from the queue for transportation matching based on any of a variety of methods and parameters. For example, as well be explained in greater detail below, the dynamic transportation matching system may select transportation requestors from the queue based on time spent in the queue (e.g., on a first-in first-out (FIFO) basis), based on maximizing the matching efficiency of the dynamic transportation matching network, based on maximizing the efficiency of matching shared riders, based on priority assignments, based on the estimated time of arrival of a transportation provider to a transportation requestor, based on the distance from a transportation provider to a transportation requestor, based on the transportation fare, based on the type of transportation requestor, based on the level of availability of transportation providers, and/or any combination of the foregoing. In some examples, the dynamic transportation matching network may assign a priority to transportation requests in the transportation request queue, where transportation requests having a higher priority may be matched before transportation requests with a lower priority. In some examples, the priority assigned to the transportation requests in the transportation request queue may be based on the length of time in the queue (e.g., FIFO); i.e., the transportation request which has been in the queue the longest may be the next request to be matched with a transportation provider. The priority assigned to transportation requests may be based on the estimated time of arrival (ETA) of the transportation provider to the transportation requestor.

In some examples, information relating to the queue may be used to make decisions in the dynamic transportation network. The information relating to the queue may include, without limitation, a length of the queue and/or the length of a queue associated with a geographic area relative to the length of a queue associated with a different geographic area. The decisions made in the dynamic transportation network based on information relating to the queue may include, without limitation, recommendations to the transportation requestor relating to alternative transportation services other than the requested transportation service, decisions associated with maintain a specified level of availability of transportation providers, decisions relating to forecasting future transportation requests, decisions relating to matching transportation requestors for shared transportation services, and decisions relating to a fare associated with the transportation request.

As described above in detail, information relating to the queue may cause the dynamic transportation system to relocate transportation providers to a different geographic area. In some examples, the dynamic transportation system may provide a transportation requestor waiting in the queue with a recommendation to take an alternative form of transportation service to the transportation requestor's destination. The alternative form of transportation may include walking, bicycling, taking a bus, taking a train, taking a subway, taking a personal mobility vehicle, or a combination thereof. The dynamic transportation system may make a recommendation for alternative transportation based in part on the queue length. The recommendation for alternative transportation may be based on, without limitation, the queue being a specified length or longer, the estimated time of the transportation requestor in the queue, the estimated time of travel from the meeting location to the transportation requestor destination using the requested transportation service, and an estimated time of travel to the transportation requestor's destination using the alternative transportation form.

In some examples, the fare associated with a transportation request may be based at least in part on the length of the queue. The fare associated with a transportation request in a particular geographic may be based on the length of the queue in that particular geographic area. The fare associated with a transportation request in a geographic area may be increased, maintained or decreased based on the length of the queue in that particular geographic area.

In some examples, systems described herein may use the length of the queue to forecast demand for future transportation requests. The dynamic transportation system may collect historical data relating to the length of the queue in a particular geographic area and use that historical data to forecast future demand for transportation requests in that particular geographic area. The dynamic transportation system may also collect and correlate historical data related to weather, day, time of day, event occurrence, and demographics to forecast future demand for transportation requests in a particular geographic area.

In some examples, the priority assigned to transportation requests may be based on the transportation fare. For example, a transportation request associated with a higher fare (e.g., a premium fare) may be assigned a higher priority. A transportation request associated with a lower fare, in contrast, may be assigned a lower priority. In some examples, the priority assigned to transportation requests may be based on the type of transportation requestor. For example, the transportation requestor may be a frequent transportation requestor that uses the transportation services of the dynamic transportation network on a frequent basis. The frequent transportation requestor may be assigned a higher priority than an infrequent transportation requestor. As another example, the transportation requestor may be a new transportation requestor that has not previously used the transportation services of the dynamic transportation network. The new transportation requestor may be assigned a higher or lower priority. As another example, the transportation requestor may be a shared transportation requestor that shares the transportation service with another transportation requestor. The shared transportation requestor may be assigned a higher or lower priority. As another example, the transportation requestor may be a subscription transportation requestor that pays for transportation services on a recurring basis per week, per month, or yearly basis. The subscription transportation requestor may be assigned a higher or lower priority.

In some examples, matching a transportation requestor with a transportation provider from the queue may be based on the level of availability of transportation providers. The dynamic transportation network may maintain a specified level of availability of transportation providers (e.g., a minimum threshold level) in order have transportation providers available to provide transportation service to transportation requestors that choose to be matched with a transportation provider when the request is made instead of having the transportation request entered into the transportation request queue. In some examples, the level of availability of transportation providers may be different between each of the sets of transportation providers 350(1)-($n$). The level of availability of transportation providers may be based on a variety of parameters including, without limitation, predicted future demand for transportation services (e.g., based on current and/or historical data), the density of transportation providers within a geographic area, transportation fare levels, and ETA to transportation requestors. The level of availability of transportation providers may be targeted to maximize transportation provider utilization and/or total dynamic transportation system throughput.

In one example, the predicted future demand for transportation services may affect the level of availability of transportation providers. For example, if an event (e.g., sporting event) will be ending in the near future within a geographic area, a sudden rise in transportation requestors may be predicted. The sudden rise in demand may require an increase in the level of available transportation providers for that geographic area. In some examples, if the density of transportation providers within a geographic area is high and the density of transportation providers within a different geographic area is low, transportation providers within the high-density area may be re-located to the area with low density of transportation providers in order to maintain a more even and stable level across multiple geographic areas. In some examples, if transportation fares are increased or decreased within a geographic area, the demand for transportation may increase or decrease and therefore affect the acceptable level of providers in that area. One potential benefit of queueing transportation requestors is in the reduction of ETA to requestors while maintaining acceptable levels of transportation providers. For example, the origin and destination locations of queued requestors may be known to the dynamic transportation matching system. Knowing these locations may allow a dynamic transportation matching system to coordinate and route transportation providers to the queued requestors more efficiently than a system that only matches requestors on demand without queuing. In addition, efficient coordination through knowledge of where requestors are to be picked up and dropped off may enable transportation providers to arrive at queued and non-queued requestors sooner.

In some examples, the transportation requests in each of the transportation request queues $310(1)$-$(n)$ may be matched to transportation providers in sets of transportation providers $350(1)$-$(n)$ respectively. Additionally or alternately, any of the requests in sets of transportation request queues $310(1)$-$(n)$ may be matched to transportation providers in any of sets of transportation providers $350(1)$-$(n)$. In some examples, the dynamic transportation matching system may match transportation requestors to transportation providers based at least in part on a constraint to maintain a level of available transportation providers in a set of transportation providers. In some examples, the maintained level of available transportation providers may be, without limitation, a minimum level, an average level, a maximum level, a target level, a set level, a computed level, and/or a varying level.

Figure 4:
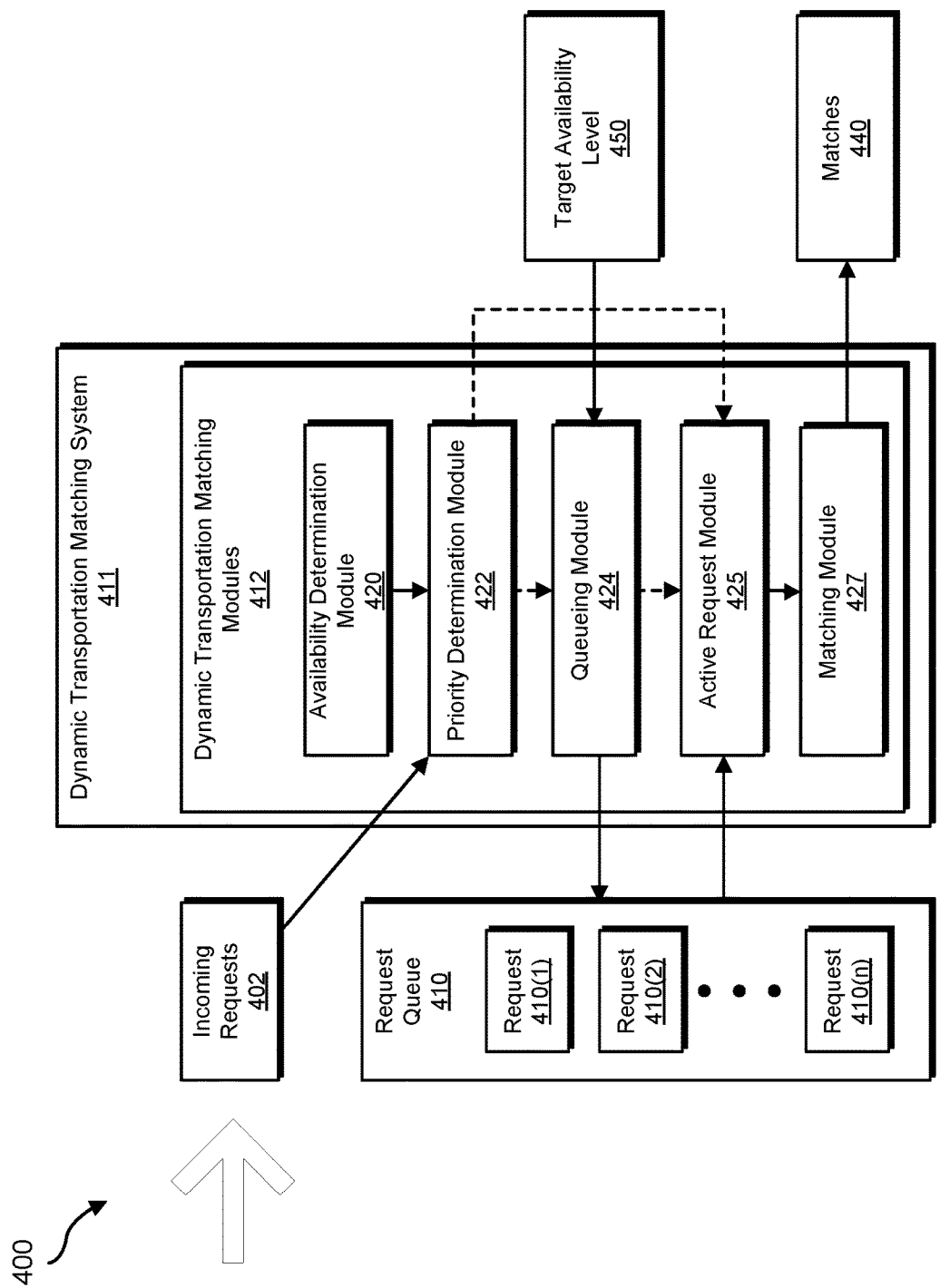
FIG. 4 is a block diagram of an of an example system for queueing and matching transportation requests in a dynamic transportation network.

FIG. 4 is a block diagram of an example system for queueing and matching transportation requests in a dynamic transportation network. As shown in FIG. 4, system 400 may include dynamic transportation matching system 411 configured with dynamic transportation matching module 412. In one example, dynamic transportation matching module 412 may include an availability determination module 420, a priority determination module 422, a queueing module 424, an active request module 425, and a matching module 427.

As an example, availability determination module 420 may determine the level of availability of transportation providers for each of the sets of transportation providers $350(1)$-$(n)$. Transportation requestors may provide incoming transportation requests 402 to priority determination module 422. Priority determination module 422 may assign a priority level to the incoming transportation request and may modify the priority level of the transportation request until the request is matched to a transportation provider or the transportation request is canceled. Target availability level 450 may set a target availability level of transportation providers for each of the sets of transportation providers $350(1)$-$(n)$ and provide the target levels to queuing module 424. Priority determination module 422 may provide transportation requests assigned priority levels from requestors choosing to wait in the request queue. Priority determination module 422 may also provide requests from requestors choosing not to wait in the queue directly to active request module 425 while bypassing queueing module 424. Queueing module 424 may provide the requests assigned priority levels from requestors choosing to wait to request queue 410. In some examples, requests in the request queue may not be matched until all of the requests not in the request queue are matched. Request queue 410 may manage the requests from each of the sets of transportation request queues $310(1)$-$(n)$. As requests come out of the request queue 410 based on their assigned priority and target availability level of transportation providers, the requests may be provided to active requests 425. Active requests 425 that have yet to be matched with a transportation provider may be provided to matching module 427 for matching the request to a transportation provider. Active requests 425 may include transportation requests with origins corresponding to a specified area and/or with destinations corresponding to a specified area. Matching module 427 may determine a match between the available transportation providers and the active requests 425. Matching module 427 may then issue matches 440.

As discussed above, in some examples dynamic transportation matching system 411 may match higher-priority requests with transportation providers on an on-demand basis while placing lower-priority requests in request queue 410. In some examples, the transportation queue may be understood as a multi-tier queue encompassing both on-demand requests and requests that are not matched on an on-demand basis. For example, all transportation requests may be placed in a queue for each geographic area and the matching decision may be made on a periodic basis. Requestors unwilling to wait (on-demand requests) may be placed at the head of the queue (higher priority) and requestors willing to wait may be queued behind the on-demand requestors (lower priority). In some examples, the dynamic transportation matching system 411 may determine the number of transportation providers in excess of a base-stock level (excess available transportation providers). The excess available transportation providers in geographic area i may be denoted as $\Delta s_i$. The dynamic transportation matching system 411 may enter all on-demand and queued transportation requests into the matching module 427. The matching module 427 may minimize the total ETA of all transportation requests under the constraints that all on-demand requests are matched, as many queued requests are matched as possible while maintaining a target level of available providers, the priority levels of the queued requests are weakly enforced, and the number of queued requests plus the number of on-demand requests in the geographic area i is less than or equal to the excess available transportation providers in geographic area i (supply constraint). In some examples, the constraint that all on-demand requests are matched may be implemented by putting a very high penalty on not matching them. The constraint that as many queued requests be assigned as possible may be enforced by placing a penalty on not matching a queued request that is a lower penalty than the penalty of violating the supply constraint. $M_1$ may be designated as the penalty for not assigning on-a demand request, $M_2$ may be designated as the penalty for violating a supply constraint, $M_3$ may be designated as the penalty for not matching a queued request, and $M_1 \gg M_2 \gg M_3$. The priority order for the request queue may be weakly enforced by increasing the priority assigned to requests based on their length of time in the queue. This increase in priority may range from very small to a larger factor that compensates for long ETAs associated with requests that have been in the queue a long time. In some examples, the base-stock level $s_0$ may be set to the target number of available transportation providers necessary to meet ETA targets. The base-stock level may be set equal to the target number of available transportation providers plus a buffer amount to account for the uncertainty in the number of future on-demand requests.

In some examples, the dynamic transportation system 411 may determine when a fare is a premium fare. In some examples, determining the amount of the premium fare based on the length of the transportation request queue may be based on there being a transportation request queue with a non-zero length. The premium fare may be based on predicting the total available transportation providers, which may be determined as the current available transportation providers plus anticipated changes in available transportation providers and may be denoted as s(t). The dynamic transportation system 411 may determine the target available transportation providers necessary to maintain the target ETA, which may be denoted as $s_0$. The dynamic transportation system 411 may determine the excess available transportation providers as the available transportation providers in excess of the target available transportation providers, which may be computed as $\Delta s=(s(t)-s_0)^+$. The dynamic transportation system 411 may then determine the premium fare that would result in the total number of predicted transportation requests being equal to the excess available transportation providers $\Delta s$.

In some examples, the dynamic transportation system 411 may maintain the fare as a premium fare before the queue is empty and may consider the number of queued and on-demand matches in determining the premium fare. Alternatively, rather than setting the premium fare so that predicted transportation requests exactly equals the excess available transportation providers, it may be set based on predicted requests=p (excess open supply), where p<1 and is a fraction of available transportation providers (e.g., 80% of available transportation providers) in order to hedge against on-demand requests fully exhausting the excess available transportation so that the queued requests may be used to regulate the level of available transportation providers. As another alternative, setting the premium fare may be based on predicted requests+k$\sqrt{\text{predictedrequests}}$=excess supply, where k is a number of standard deviations of requests.

Figure 5:
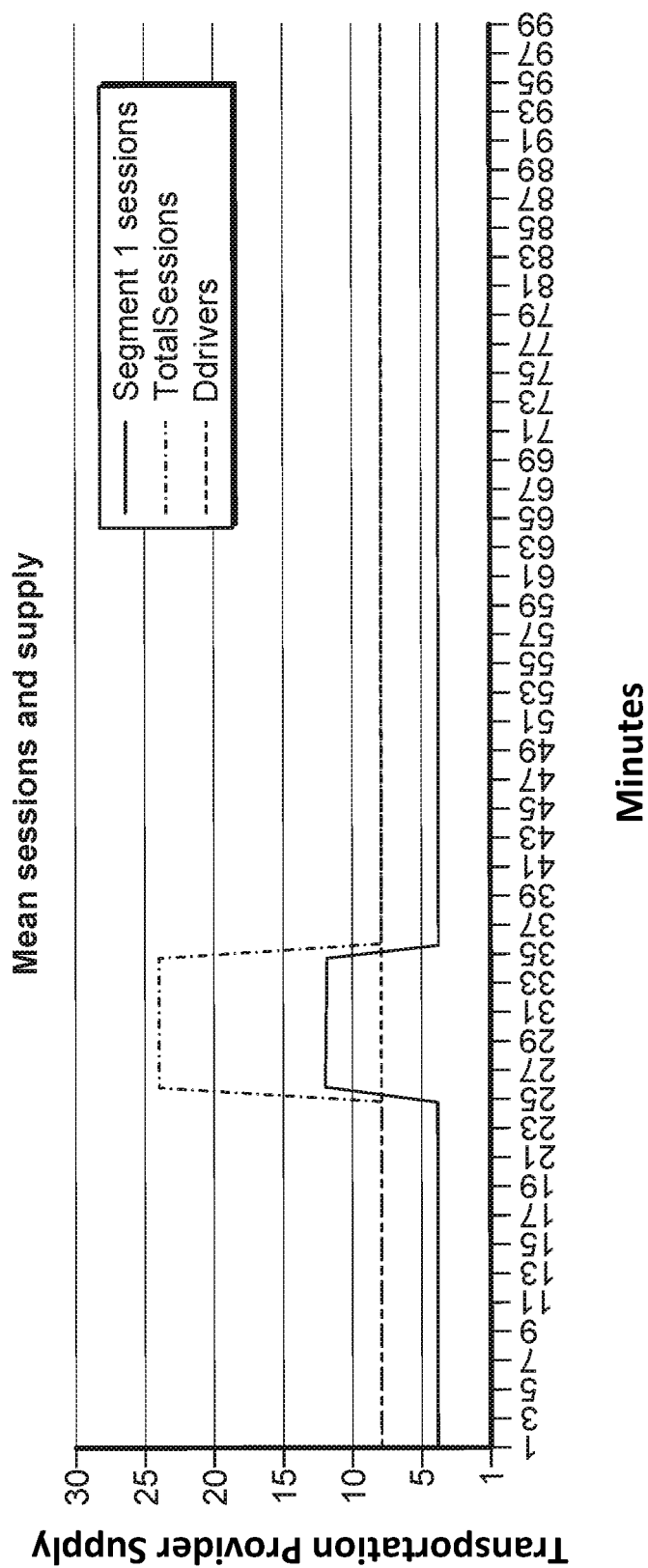
FIG. 5 is a graph illustrating an example of transportation supply in a dynamic transportation network.

FIG. 5 is a graph illustrating an example of transportation supply in a dynamic transportation network. FIG. 5 shows a 100-minute-long period with a transportation request demand spike occurring between periods 25 and 35 and a constant inflow of transportation providers. Segment 1 sessions are shown for transportation requestors that may be unwilling to wait for transportation service. In this example, placing incoming transportation requestors in a queue may enable the dynamic transportation network to maintain a stable level of available transportation providers.

Figure 6:
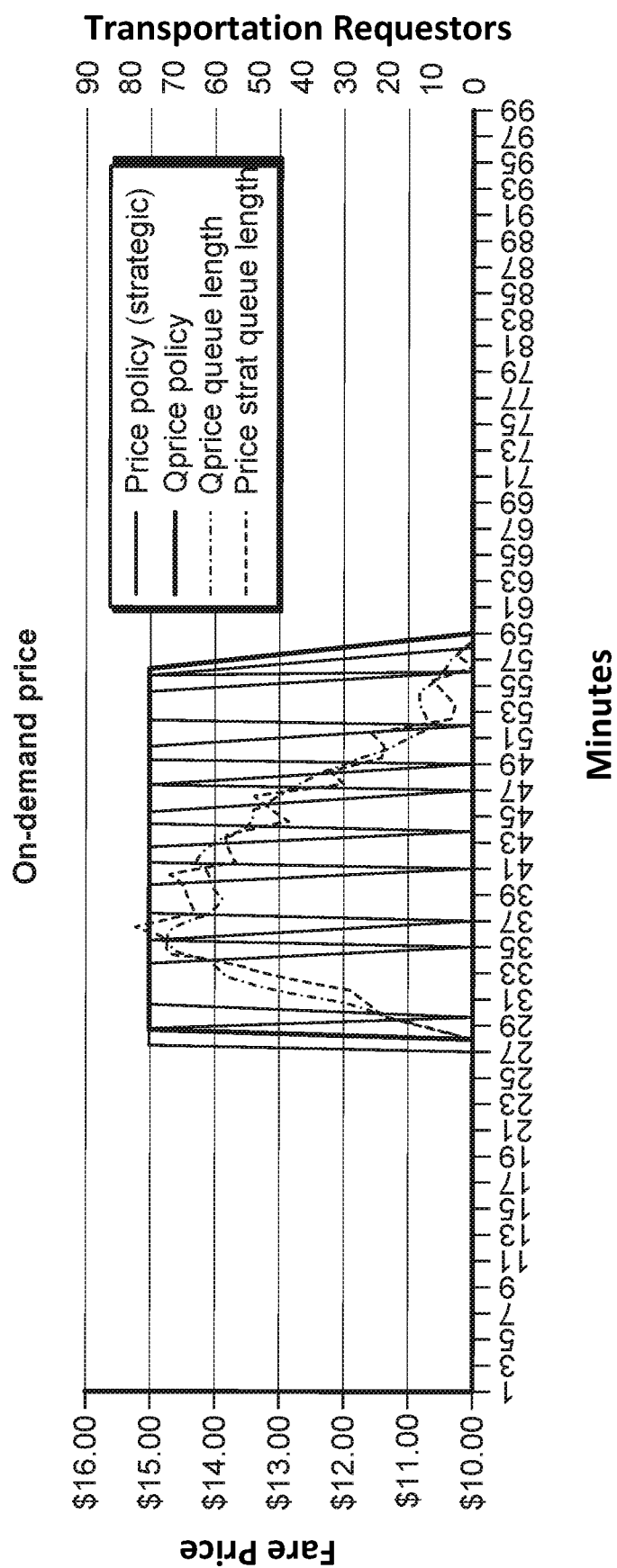
FIG. 6 is a graph illustrating an example of transportation price policy in a dynamic transportation network.

FIG. 6 is a graph illustrating an example of transportation price policy in a dynamic transportation network. As shown in FIG. 6, a dynamic transportation network that actively queues transportation requests during times of high transportation request demand may create a stable level of availability of transportation providers and stabilize the fare policy as compared to a dynamic transportation network that does not queue transportation requests. FIG. 6 shows an example of the fare policy and level of availability of transportation providers under the two systems (with and without queuing). Without queuing, the system may experience extreme oscillations in the fare relative to the fare when queueing is implemented due to transportation requestors waiting for the fare to be reduced in the non-queuing system. When the fare is reduced, a surge of requests may be received, which may in turn cause a strong decrease in the availability level of providers. The resulting surge of demand may deplete the available supply, which may cause the fare to rise again. When the fare rises again, the fare-sensitive requestors may go back to waiting and the level of transportation provider availability may increase. This cycle may result in high fluctuations between request demand and provider availability. In contrast, under the queuing system, fare-sensitive requestors that join the queue may be matched in a controlled manner as transportation provider supply becomes available. In this example, the queueing system stabilizes the level of availability of transportation providers. This stabilization, combined with a policy that the premium fare is not lowered to the base fare until the request queue is empty, may result in a smooth sustained fare that matches the peak demand period.

Figure 7:
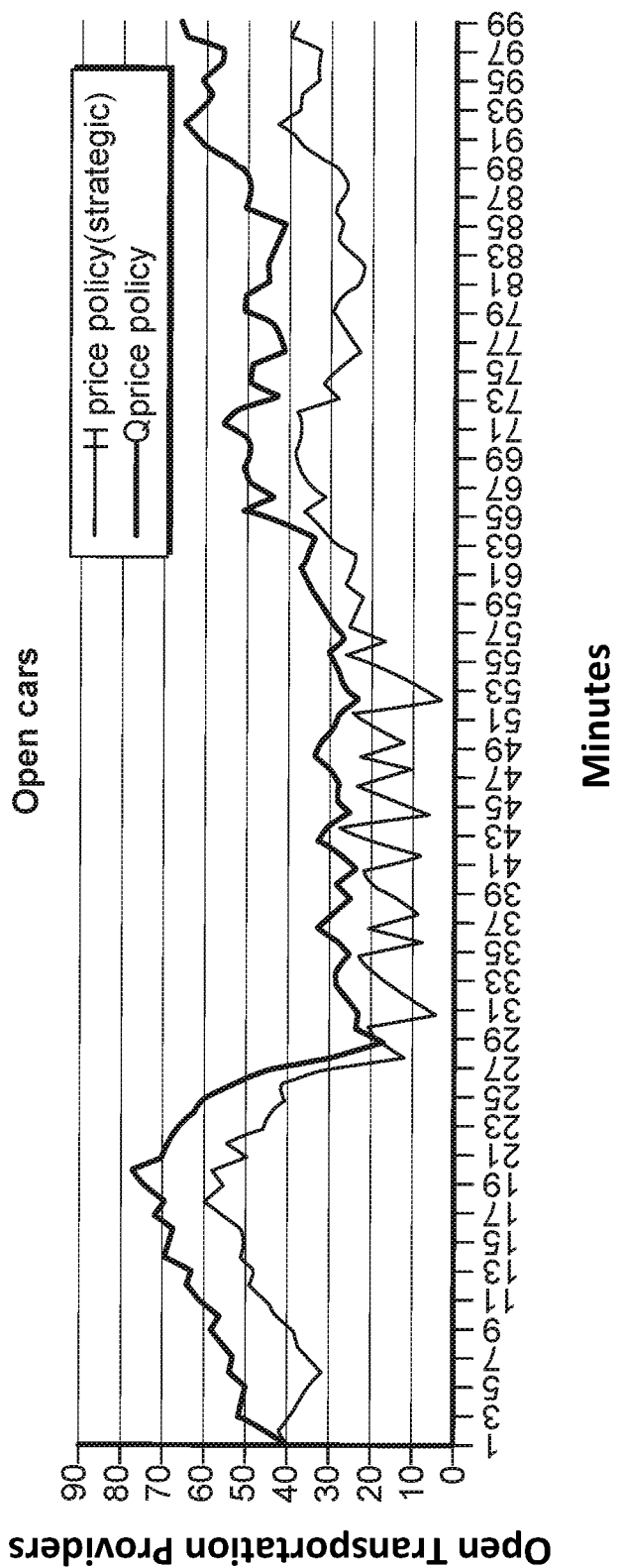
FIG. 7 is a graph illustrating an example of transportation supply as a function of transportation price policy in a dynamic transportation network.

FIG. 7 is a graph illustrating an example of transportation provider availability as a function of transportation price policy in a dynamic transportation network. As shown in FIG. 7, a dynamic transportation network that actively queues transportation requests during times of high transportation request demand may create a higher level of availability of transportation providers as compared to a dynamic transportation network that does not queue transportation requests. The graph in FIG. 7 shows how the level of availability of transportation providers differs for the two systems. The fare and transportation request demand fluctuations of the non-queuing system may create significant fluctuations in the level of availability of transportation providers, while the queueing system may maintain a more even and stable level of availability of transportation providers. In the example shown in FIG. 7, the level of availability of transportation providers stays above the target level of 20.

Figure 8:
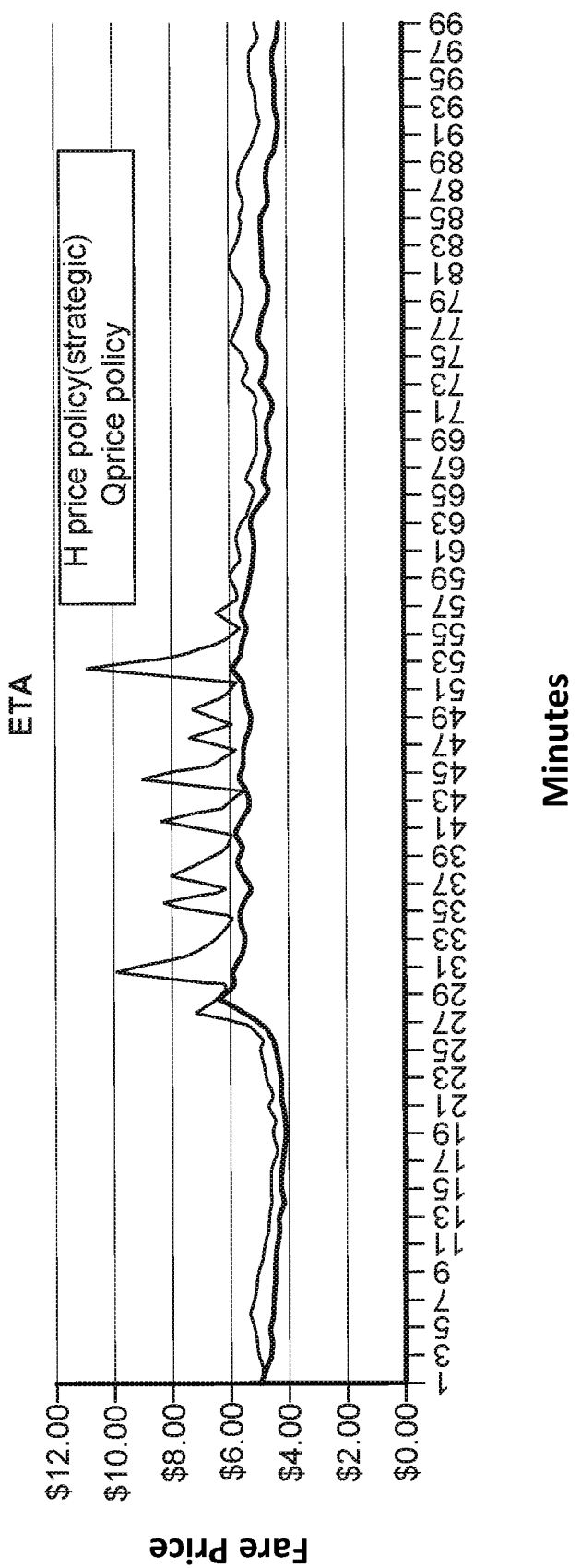
FIG. 8 is a graph illustrating an example of estimated arrival times of transportation providers as a function of transportation price policy in a dynamic transportation network.

FIG. 8 is a graph illustrating an example of estimated arrival times of transportation providers as a function of transportation price policy in a dynamic transportation network. As shown in FIG. 8, a dynamic transportation network that actively queues transportation requests during times of high transportation request demand may significantly reduce the average ETAs as compared to a dynamic transportation network that does not queue transportation requests. FIG. 8 shows that under the non-queuing system, ETAs vary and reach extremes of about 9-10 minutes during periods of high transportation request demand. In contrast, under the queuing system, ETAs may be maintained at a more stable level and average about 6 minutes or lower. The lower ETA times achieved by the queueing system may benefit both the time-sensitive transportation requestors that cannot wait for transportation as well as the non-time-sensitive transportation requestors that may be willing to wait for transportation.

Figure 9:
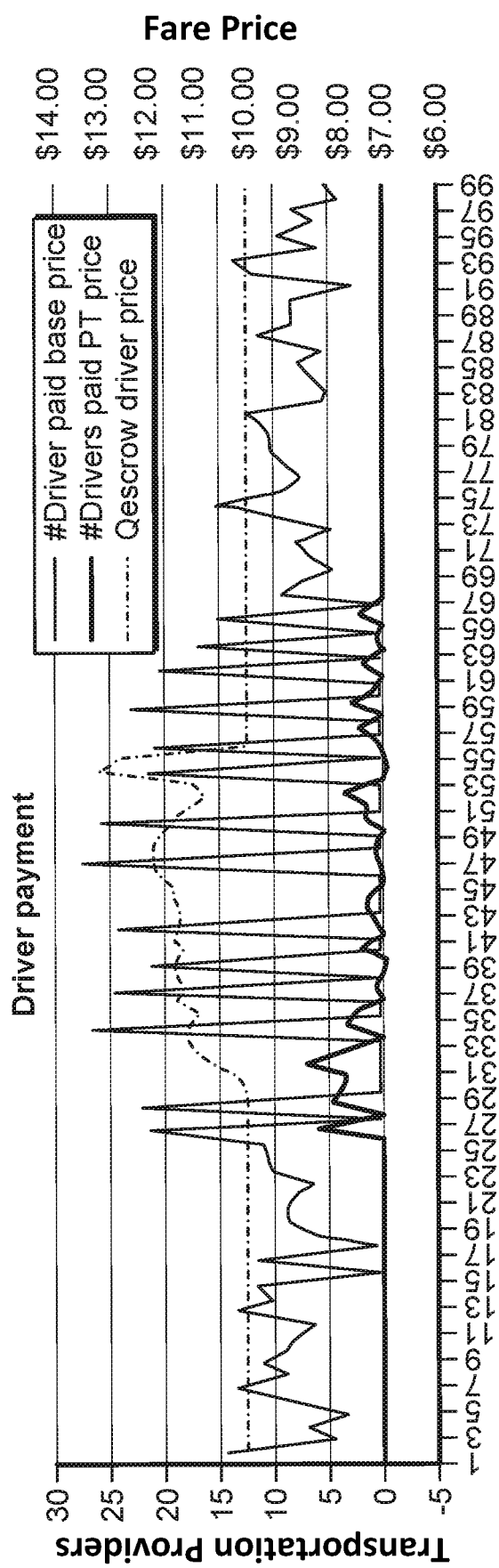
FIG. 9 is a graph illustrating an example of transportation provider payment as a function of transportation price policy in a dynamic transportation network.

FIG. 9 is a graph illustrating an example of transportation provider payment as a function of transportation price policy in a dynamic transportation network. FIG. 9 shows the difference in transportation provider payments for a dynamic transportation network that actively queues transportation requests during times of high transportation request demand as compared to a dynamic transportation network that does not queue transportation requests. FIG. 9 shows the number of transportation providers receiving the base fare and the number of transportation providers receiving the premium fare over time within the non-queuing system. In this example, relatively few transportation providers receive the premium fare and may be interspersed in time with a large numbers of transportation providers receiving the base fare. This volatility in payments to transportation providers may be reduced through implementation of the queuing system with escrow payments. In some examples, when a transportation provider is matched with a transportation requestor paying a premium fare, a portion of the premium fare minus the base fare is added to an escrow account. When a transportation provider is matched to a transportation requestor paying a base fare, a portion of the escrow account may be paid to the transportation provider. Under the queueing system with escrow payments, transportation provider pay may be more stable.

Figure 10:
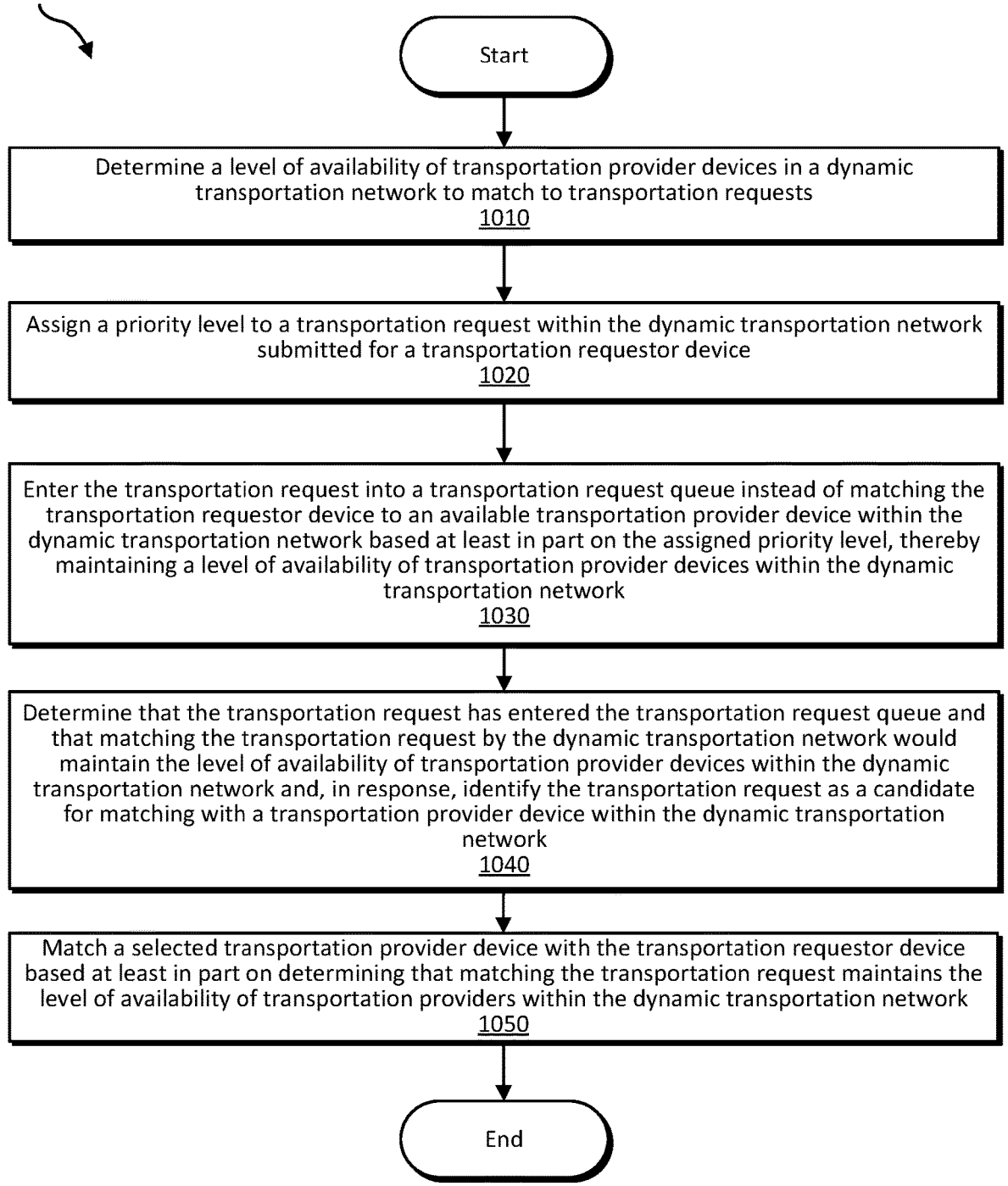
FIG. 10 is a flow diagram of an example method for matching transportation requests in a dynamic transportation network.

FIG. 10 is a flow diagram of an example method 1000 for matching transportation requests in a dynamic transportation network. As shown in FIG. 10, the method may include, at step 1010, determining a level of availability of transportation provider devices in a dynamic transportation network to match to transportation requests. At step 1020, the method may include assigning a priority level to a transportation request within the dynamic transportation network submitted for a transportation requestor device. At step 1030, the method may include entering the transportation request into a transportation request queue instead of matching the transportation requestor device to an available transportation provider device within the dynamic transportation network based at least in part on the assigned priority level, thereby maintaining a level of availability of transportation provider devices within the dynamic transportation network. At step 1040, the method may include determining that the transportation request has entered the transportation request queue and that matching the transportation request by the dynamic transportation network would maintain the level of availability of transportation provider devices within the dynamic transportation network and, in response, identifying the transportation request as a candidate for matching with a transportation provider device within the dynamic transportation network. At step 1050, the method may include matching a selected transportation provider device with the transportation requestor device based at least in part on determining that matching the transportation request maintains the level of availability of transportation provider devices within the dynamic transportation network.

In one example, a computer-implemented method may include determining a level of availability of transportation provider devices in a dynamic transportation network to match to transportation requests. In some examples, the method may further include assigning a priority level to a transportation request within the dynamic transportation network submitted for a transportation requestor device. In some examples, the method may further include entering the transportation request into a transportation request queue instead of matching the transportation requestor device to an available transportation provider device within the dynamic transportation network based at least in part on the assigned priority level, thereby maintaining a level of availability of transportation provider devices within the dynamic transportation network. In some examples, the method may further include determining that matching the transportation request by the dynamic transportation network would maintain the level of availability of transportation provider devices within the dynamic transportation network and, in response, identifying the transportation request as a candidate for matching with a transportation provider device within the dynamic transportation network. In some examples, the method may further include matching a selected transportation provider device with the transportation requestor device based at least in part on determining that matching the transportation request maintains the level of availability of transportation provider devices within the dynamic transportation network.

In some examples, the priority level assigned to the transportation request may be based on at least one of a fare associated with the transportation request, a distance from the transportation requestor device to the transportation provider device, an estimated time of arrival of the transportation provider device, a length of time the transportation request is in the transportation request queue, and a type of the transportation requestor device.

In some examples, the type of the transportation requestor may be associated with at least one of a frequent transportation requestor, a new transportation requestor, a shared transportation requestor, a scheduled transportation requestor, and a subscription transportation requestor.

In some examples, the method may further include identifying a geographical area that corresponds to the transportation request queue. In some examples, the method may further include evaluating a first potential transportation matching between an additional transportation requestor device and an additional transportation provider device and determining that the potential transportation matching would increase a level of availability of transportation provider devices to match to transportation requests within the geographical area relative to a second potential transportation matching between an additional transportation requestor device and an additional transportation provider device. In some examples, the method may further include matching the first transportation requestor device and the additional transportation provider device instead of matching the second potential transportation matching between the additional transportation requestor device and the additional transportation provider device based at least in part on determining the effect that the potential transportation matching would have on the level of availability of transportation provider devices and a length of the transportation request queue.

In some examples, increasing the priority level assigned to the transportation request may be based at least in part on a length of time the transportation request has spent in the transportation request queue.

In some examples, the priority level assigned to the transportation request may designate the transportation request for entry into the transportation request queue based at least in part on the fare associated with the transportation request.

In some examples, the method may further include matching transportation requests not placed within the transportation request queue before matching transportation requests placed within the transportation request queue based on the transportation requests placed within the transportation request queue being placed within the transportation request queue.

In some examples, determining the premium fare may be based at least in part on at least one of the level of availability of transportation provider devices in the dynamic transportation network and a length of the transportation request queue.

In some examples, when the transportation provider device is matched to the transportation requestor device and a fare associated with the transportation request is a premium fare, a fare amount based at least in part on the premium fare minus a base fare may be added to an escrow account.

In some examples, a transportation provider may be paid a portion of the fare amount from the escrow account.

In one example, a system may include one or more physical processors and one or more memories coupled to one or more of the physical processors, the one or more memories may include instructions operable when executed by the one or more physical processors to cause the system to perform operations including determining a level of availability of transportation provider devices in a dynamic transportation network to match to transportation requests. The operations may further include assigning a priority level to a transportation request within the dynamic transportation network submitted for a transportation requestor device. The operations may further include entering the transportation request into a transportation request queue instead of matching the transportation requestor device to an available transportation provider device within the dynamic transportation network based at least in part on the assigned priority level, thereby maintaining a level of availability of transportation provider devices within the dynamic transportation network. The operations may further include determining that matching the transportation request by the dynamic transportation network would maintain the level of availability of transportation provider devices within the dynamic transportation network. The operations may further include selecting a transportation provider device from among the transportation provider devices. The operations may further include matching the selected transportation provider device to the transportation requestor device from the transportation request queue based at least in part on determining that matching the transportation request maintains the level of availability of transportation provider devices within the dynamic transportation network.

In some examples, the priority level assigned to the transportation request may be based on at least one of a fare associated with the transportation request, a distance from the transportation requestor device to the transportation provider device, an estimated time of arrival of the transportation provider device, a length of time the transportation request is in the transportation request queue, and a type of the transportation requestor device.

In some examples, the type of the transportation requestor device may be associated with at least one of a frequent transportation requestor, a new transportation requestor, a shared transportation requestor, a scheduled transportation requestor, and a subscription transportation requestor.

In some examples, increasing the priority level assigned to the transportation request may be based at least in part on a length of time the transportation request has spent in the transportation request queue.

In some examples, the priority level assigned to the transportation request may designate the transportation request for entry into the transportation request queue based at least in part on the fare associated with the transportation request.

In some examples, the operations may further include matching transportation requests not placed within the transportation request queue before matching transportation requests placed within the transportation request queue based on the transportation requests placed within the transportation request queue being placed within the transportation request queue.

In some examples, when the transportation provider device is matched to the transportation requestor device and a fare associated with the transportation request is a premium fare, a fare amount based at least in part on the premium fare minus a base fare may be added to an escrow account.

In some examples, a transportation provider may be paid a portion of the fare amount from the escrow account.

In one example, a non-transitory computer-readable storage medium may include computer-readable instructions that, when executed by at least one processor of a computing device, cause the computing device to determine a level of availability of transportation provider devices in a dynamic transportation network to match to transportation requests. In some examples, the instructions may further cause the computing device to assign a priority level to a transportation request within the dynamic transportation network submitted for a transportation requestor device. In some examples, the instructions may further cause the computing device to enter the transportation request into a transportation request queue instead of matching the transportation requestor device to an available transportation provider device within the dynamic transportation network based at least in part on the assigned priority level, thereby maintaining a level of availability of transportation provider devices within the dynamic transportation network. In some examples, the instructions may further cause the computing device to determine that matching the transportation request by the dynamic transportation network would maintain the level of availability of transportation provider devices within the dynamic transportation network. In some examples, the instructions may further cause the computing device to select a transportation provider device from among the transportation provider devices. In some examples, the instructions may further cause the computing device to match the selected transportation provider device to the transportation requestor device from the transportation request queue based at least in part on determining that matching the transportation request maintains the level of availability of transportation provider devices within the dynamic transportation network.

Figure 11:
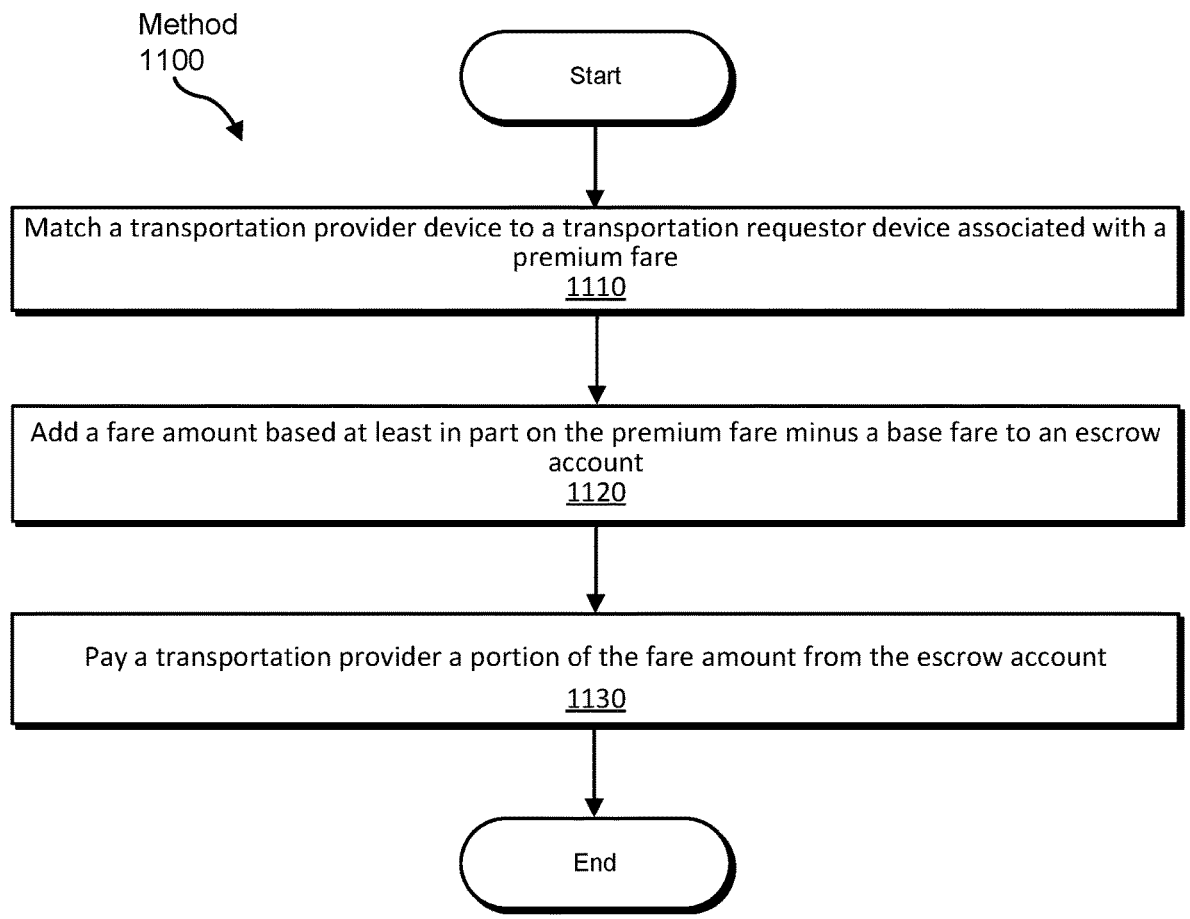
FIG. 11 is a flow diagram of an example method for providing transportation provider payment in a dynamic transportation network.

FIG. 11 is a flow diagram of an example method 1100 for providing transportation provider payment in a dynamic transportation network. As shown in FIG. 11, the method may include, at step 1110, matching a transportation provider device to a transportation requestor device associated with a premium fare. At step 1120, the method may include adding a fare amount based at least in part on the premium fare minus a base fare to an escrow account. At step 1130, the method may include paying a transportation provider a portion of the fare amount from the escrow account.

Embodiments of the instant disclosure may include or be implemented in conjunction with a dynamic transportation matching system. A transportation matching system may arrange rides on an on-demand and/or ad-hoc basis by, e.g., matching one or more ride requestors with one or more ride providers. For example, a transportation matching system may provide one or more transportation matching services for a ridesharing service, a ridesourcing service, a taxicab service, a car-booking service, an autonomous vehicle service, or some combination and/or derivative thereof. The transportation matching system may include and/or interface with any of a variety of subsystems that may implement, support, and/or improve a transportation matching service. For example, the transportation matching system may include a matching system (e.g., that matches requestors to ride opportunities and/or that arranges for requestors and/or providers to meet), a mapping system, a navigation system (e.g., to help a provider reach a requestor, to help a requestor reach a provider, and/or to help a provider reach a destination), a reputation system (e.g., to rate and/or gauge the trustworthiness of a requestor and/or a provider), a payment system, and/or an autonomous or semi-autonomous driving system. The transportation matching system may be implemented on various platforms, including a requestor-owned mobile device, a computing system installed in a vehicle, a requestor-owned mobile device, a server computer system, or any other hardware platform capable of providing transportation matching services to one or more requestors and/or providers.

Figure 12:
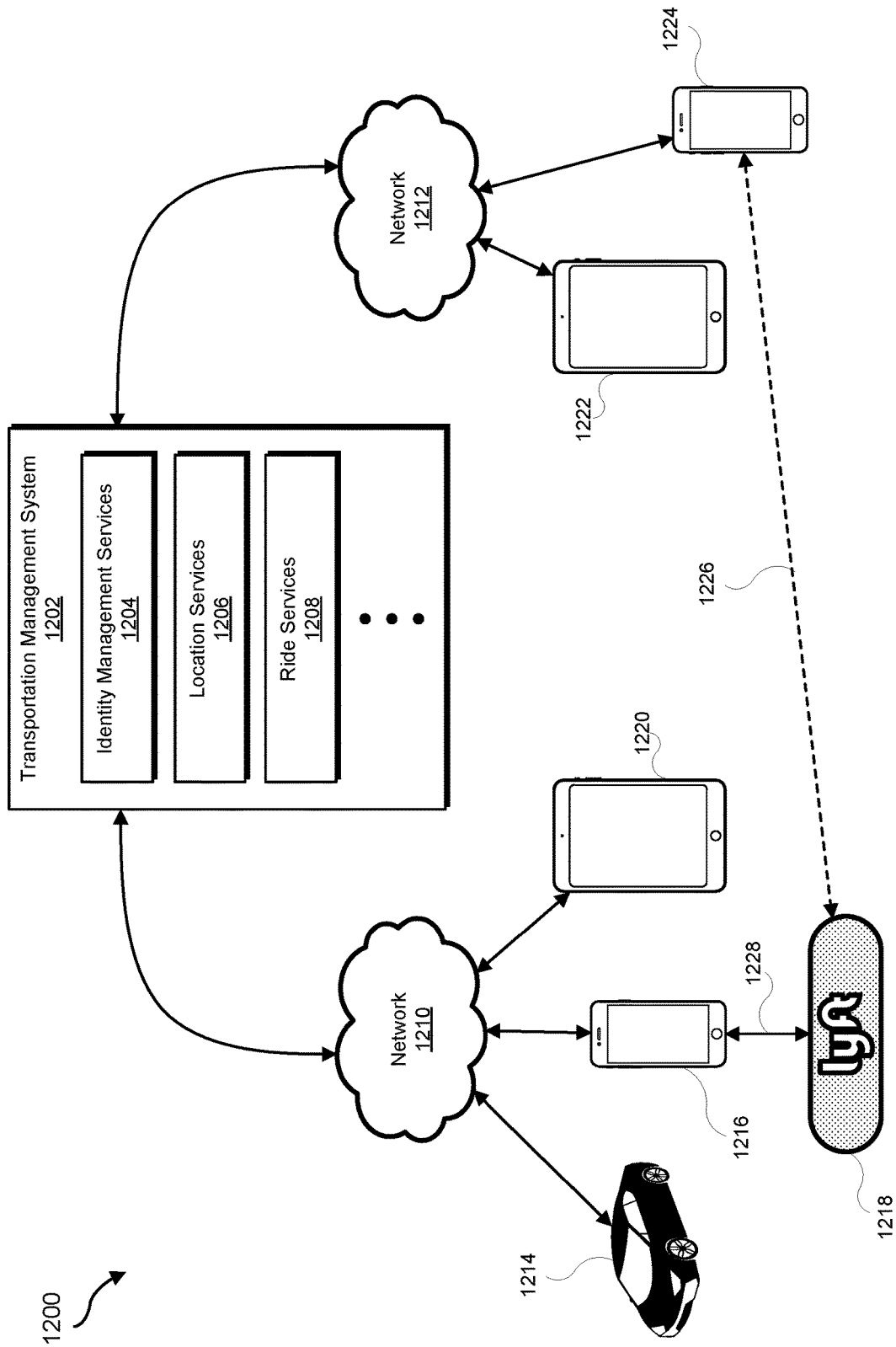
FIG. 12 is an illustration of an example transportation requestor/transportation provider management environment.

FIG. 12 shows a transportation management environment 1200, in accordance with various embodiments. As shown in FIG. 12, a transportation management system 1202 may run one or more services and/or software applications, including identity management services 1204, location services 1206, ride services 1208, and/or other services. Although FIG. 12 shows a certain number of services provided by transportation management system 1202, more or fewer services may be provided in various implementations. In addition, although FIG. 12 shows these services as being provided by transportation management system 1202, all or a portion of any of the services may be processed in a distributed fashion. For example, computations associated with a service task may be performed by a combination of transportation management system 1202 (including any number of servers, databases, etc.), one or more devices associated with a provider (e.g., devices integrated with managed vehicles 1214, provider's computing devices 1216 and tablets 1220, and transportation management vehicle devices 1218), and/or more or more devices associated with a ride requestor (e.g., the requestor's computing devices 1224 and tablets 1222). In some embodiments, transportation management system 1202 may include one or more general purpose computers, server computers, clustered computing systems, cloud-based computing systems, and/or any other computing systems or arrangements of computing systems. Transportation management system 1202 may be configured to run any or all of the services and/or software components described herein. In some embodiments, the transportation management system 1202 may include an appropriate operating system and/or various server applications, such as web servers capable of handling hypertext transport protocol (HTTP) requests, file transfer protocol (FTP) servers, database servers, etc.

In some embodiments, identity management services 1204 may be configured to perform authorization services for requestors and providers and/or manage their interactions and/or data with transportation management system 1202. This may include, e.g., authenticating the identity of providers and determining that they are authorized to provide services through transportation management system 1202. Similarly, requestors' identities may be authenticated to determine whether they are authorized to receive the requested services through transportation management system 1202. Identity management services 1204 may also manage and/or control access to provider and/or requestor data maintained by transportation management system 1202, such as driving and/or ride histories, vehicle data, personal data, preferences, usage patterns as a ride provider and/or as a ride requestor, profile pictures, linked third-party accounts (e.g., credentials for music and/or entertainment services, social-networking systems, calendar systems, task-management systems, etc.) and any other associated information. Transportation management system 1202 may also manage and/or control access to provider and/or requestor data stored with and/or obtained from third-party systems. For example, a requester or provider may grant transportation management system 1202 access to a third-party email, calendar, or task management system (e.g., via the user's credentials). As another example, a requestor or provider may grant, through a mobile device (e.g., 1216, 1220, 1222, or 1224), a transportation application associated with transportation management system 1202 access to data provided by other applications installed on the mobile device. In some examples, such data may be processed on the client and/or uploaded to transportation management system 1202 for processing.

In some embodiments, transportation management system 1202 may provide ride services 1208, which may include ride matching and/or management services to connect a requestor to a provider. For example, after identity management services module 1204 has authenticated the identity a ride requestor, ride services module 1208 may attempt to match the requestor with one or more ride providers. In some embodiments, ride services module 1208 may identify an appropriate provider using location data obtained from location services module 1206. Ride services module 1208 may use the location data to identify providers who are geographically close to the requestor (e.g., within a certain threshold distance or travel time) and/or who are otherwise a good match with the requestor. Ride services module 1208 may implement matching algorithms that score providers based on, e.g., preferences of providers and requestors; vehicle features, amenities, condition, and/or status; providers' preferred general travel direction and/or route, range of travel, and/or availability; requestors' origination and destination locations, time constraints, and/or vehicle feature needs; and any other pertinent information for matching requestors with providers. In some embodiments, ride services module 1208 may use rule-based algorithms and/or machine-learning models for matching requestors and providers.

Transportation management system 1202 may communicatively connect to various devices through networks 1210 and/or 1212. Networks 1210 and 1212 may include any combination of interconnected networks configured to send and/or receive data communications using various communication protocols and transmission technologies. In some embodiments, networks 1210 and/or 1212 may include local area networks (LANs), wide-area networks (WANs), and/or the Internet, and may support communication protocols such as transmission control protocol/Internet protocol (TCP/IP), Internet packet exchange (IPX), systems network architecture (SNA), and/or any other suitable network protocols. In some embodiments, data may be transmitted through networks 1210 and/or 1212 using a mobile network (such as a mobile telephone network, cellular network, satellite network, or other mobile network), a public switched telephone network (PSTN), wired communication protocols (e.g., Universal Serial Bus (USB), Controller Area Network (CAN)), and/or wireless communication protocols (e.g., wireless LAN (WLAN) technologies implementing the IEEE 802.11 family of standards, Bluetooth, Bluetooth Low Energy, Near Field Communication (NFC), Z-Wave, and ZigBee). In various embodiments, networks 1210 and/or 1212 may include any combination of networks described herein or any other type of network capable of facilitating communication across networks 1210 and/or 1212.

In some embodiments, transportation management vehicle device 1218 may include a provider communication device configured to communicate with users, such as drivers, passengers, pedestrians, and/or other users. In some embodiments, transportation management vehicle device 1218 may communicate directly with transportation management system 1202 or through another provider computing device, such as provider computing device 1216. In some embodiments, a requestor computing device (e.g., device 1224) may communicate via a connection 1226 directly with transportation management vehicle device 1218 via a communication channel and/or connection, such as a peer-to-peer connection, Bluetooth connection, NFC connection, ad hoc wireless network, and/or any other communication channel or connection. Although FIG. 12 shows particular devices communicating with transportation management system 1202 over networks 1210 and 1212, in various embodiments, transportation management system 1202 may expose an interface, such as an application programming interface (API) or service provider interface (SPI) to enable various third parties which may serve as an intermediary between end users and transportation management system 1202.

In some embodiments, devices within a vehicle may be interconnected. For example, any combination of the following may be communicatively connected: vehicle 1214, provider computing device 1216, provider tablet 1220, transportation management vehicle device 1218, requestor computing device 1224, requestor tablet 1222, and any other device (e.g., smart watch, smart tags, etc.). For example, transportation management vehicle device 1218 may be communicatively connected to provider computing device 1216 and/or requestor computing device 1224. Transportation management vehicle device 1218 may establish communicative connections, such as connections 1226 and 1228, to those devices via any suitable communication technology, including, e.g., WLAN technologies implementing the IEEE 802.11 family of standards, Bluetooth, Bluetooth Low Energy, NFC, Z-Wave, ZigBee, and any other suitable short-range wireless communication technology.

In some embodiments, users may utilize and interface with one or more services provided by the transportation management system 1202 using applications executing on their respective computing devices (e.g., 1216, 1218, 1220, and/or a computing device integrated within vehicle 1214), which may include mobile devices (e.g., an iPhone®, an iPad®, mobile telephone, tablet computer, a personal digital assistant (PDA)), laptops, wearable devices (e.g., smart watch, smart glasses, head mounted displays, etc.), thin client devices, gaming consoles, and any other computing devices. In some embodiments, vehicle 1214 may include a vehicle-integrated computing device, such as a vehicle navigation system, or other computing device integrated with the vehicle itself, such as the management system of an autonomous vehicle. The computing device may run on any suitable operating systems, such as Android®, iOS®, macOS®, Windows®, Linux®, UNIX®, or UNIX®-based or Linux®-based operating systems, or other operating systems. The computing device may further be configured to send and receive data over the Internet, short message service (SMS), email, and various other messaging applications and/or communication protocols. In some embodiments, one or more software applications may be installed on the computing device of a provider or requestor, including an application associated with transportation management system 1202. The transportation application may, for example, be distributed by an entity associated with the transportation management system via any distribution channel, such as an online source from which applications may be downloaded. Additional third-party applications unassociated with the transportation management system may also be installed on the computing device. In some embodiments, the transportation application may communicate or share data and resources with one or more of the installed third-party applications.

Figure 13:
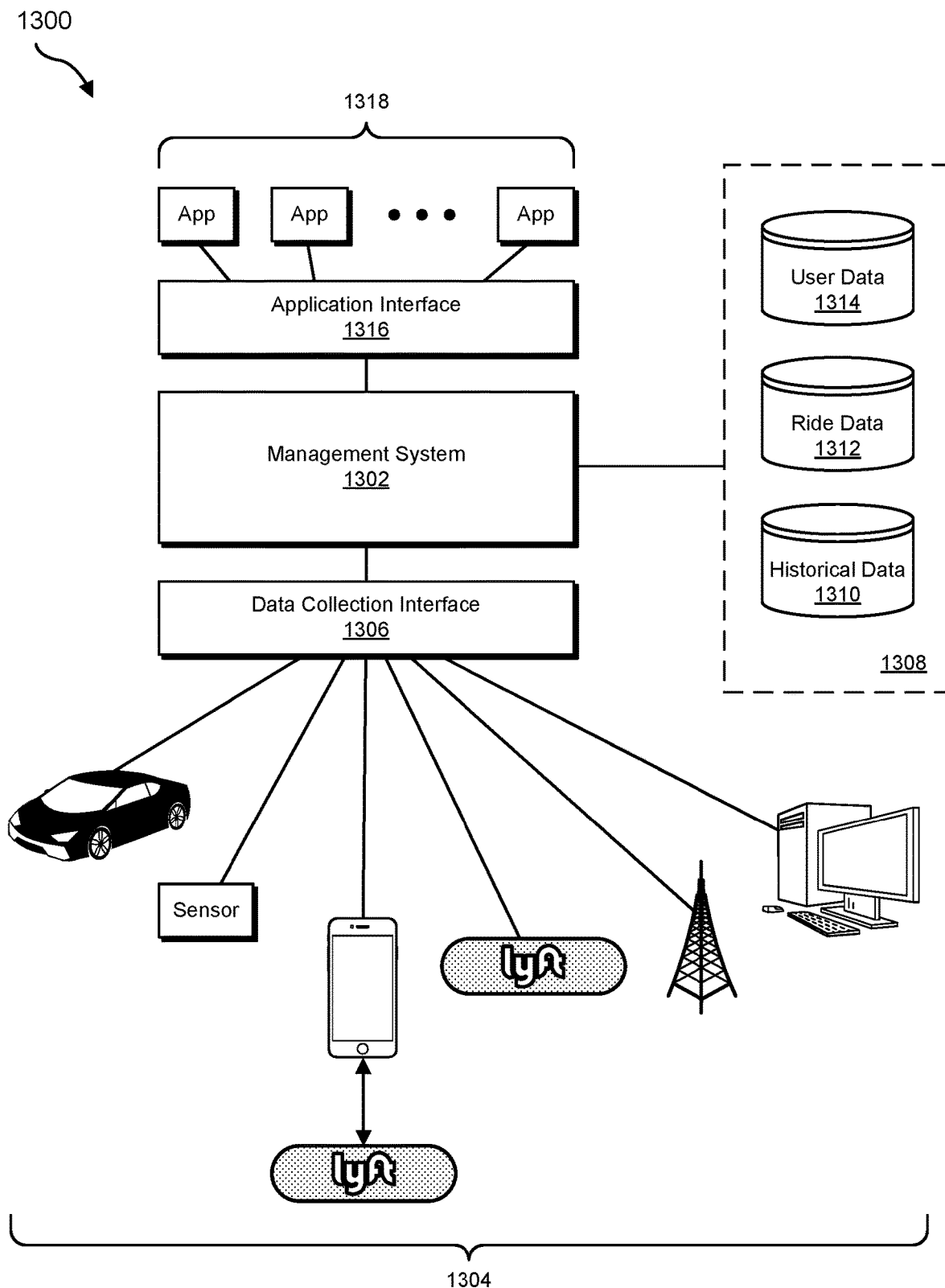
FIG. 13 is an illustration of an example data collection and application management system.

FIG. 13 shows a data collection and application management environment 1300, in accordance with various embodiments. As shown in FIG. 13, management system 1302 may be configured to collect data from various data collection devices 1304 through a data collection interface 1306. As discussed above, management system 1302 may include one or more computers and/or servers or any combination thereof. Data collection devices 1304 may include, but are not limited to, user devices (including provider and requestor computing devices, such as those discussed above), provider communication devices, laptop or desktop computers, vehicle data (e.g., from sensors integrated into or otherwise connected to vehicles), ground-based or satellite-based sources (e.g., location data, traffic data, weather data, etc.), or other sensor data (e.g., roadway embedded sensors, traffic sensors, etc.). Data collection interface 1306 can include, e.g., an extensible device framework configured to support interfaces for each data collection device. In various embodiments, data collection interface 1306 may be extended to support new data collection devices as they are released and/or to update existing interfaces to support changes to existing data collection devices. In various embodiments, data collection devices may communicate with data collection interface 1306 over one or more networks. The networks may include any network or communication protocol as would be recognized by one of ordinary skill in the art, including those networks discussed above.

As shown in FIG. 13, data received from data collection devices 1304 can be stored in data store 1308. Data store 1308 may include one or more data stores, such as databases, object storage systems and services, cloud-based storage services, and other data stores. For example, various data stores may be implemented on a non-transitory storage medium accessible to management system 1302, such as historical data store 1310, ride data store 1312, and user data store 1314. Data stores 1308 can be local to management system 1302, or remote and accessible over a network, such as those networks discussed above or a storage-area network or other networked storage system. In various embodiments, historical data 1310 may include historical traffic data, weather data, request data, road condition data, or any other data for a given region or regions received from various data collection devices. Ride data 1312 may include route data, request data, timing data, and other ride related data, in aggregate and/or by requestor or provider. User data 1314 may include user account data, preferences, location history, and other user-specific data. Although certain data stores are shown by way of example, any data collected and/or stored according to the various embodiments described herein may be stored in data stores 1308.

As shown in FIG. 13, an application interface 1316 can be provided by management system 1302 to enable various apps 1318 to access data and/or services available through management system 1302. Apps 1318 may run on various user devices (including provider and requestor computing devices, such as those discussed above) and/or may include cloud-based or other distributed apps configured to run across various devices (e.g., computers, servers, or combinations thereof). Apps 1318 may include, e.g., aggregation and/or reporting apps which may utilize data 1308 to provide various services (e.g., third-party ride request and management apps). In various embodiments, application interface 1316 can include an API and/or SPI enabling third party development of apps 1318. In some embodiments, application interface 1316 may include a web interface, enabling web-based access to data 1308 and/or services provided by management system 1302. In various embodiments, apps 1318 may run on devices configured to communicate with application interface 1316 over one or more networks. The networks may include any network or communication protocol as would be recognized by one of ordinary skill in the art, including those networks discussed above, in accordance with an embodiment of the present disclosure.

While various embodiments of the present disclosure are described in terms of a ridesharing service in which the ride providers are human drivers operating their own vehicles, in other embodiments, the techniques described herein may also be used in environments in which ride requests are matched to autonomous vehicles. For example, a transportation management system of a ridesharing service may facilitate the fulfillment of ride requests using both human drivers and autonomous vehicles.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   determining a level of availability of transportation provider devices in a dynamic transportation network to match to transportation requests;
   assigning a priority level to a transportation request within the dynamic transportation network submitted for a transportation requestor device;
   entering the transportation request into a transportation request queue instead of matching the transportation requestor device to an available transportation provider device within the dynamic transportation network based at least in part on the assigned priority level, thereby maintaining a level of availability of transportation provider devices within the dynamic transportation network;
   determining that matching the transportation request by the dynamic transportation network would maintain the level of availability of transportation provider devices within the dynamic transportation network and, in response, identifying the transportation request as a candidate for matching with a transportation provider device within the dynamic transportation network; and matching a selected transportation provider device with the transportation requestor device based at least in part on determining that matching the transportation request maintains the level of availability of transportation provider devices within the dynamic transportation network, wherein transportation requests not placed within the transportation request queue are matched before matching transportation requests placed within the transportation request queue based on the transportation requests placed within the transportation request queue being placed within the transportation request queue.

2. The computer-implemented method of claim 1, wherein the priority level assigned to the transportation request is based on at least one of:
- a fare associated with the transportation request;
- a distance from the transportation requestor device to the transportation provider device;
- an estimated time of arrival of the transportation provider device;
- an ability to match multiple transportation requestor devices;
- a location of the transportation provider device;
- an overlap between a route associated with the transportation request and a route associated with an additional transportation request;
- a length of time the transportation request is in the transportation request queue; or
- a type of the transportation request.

3. The computer-implemented method of claim 2, wherein the type of the transportation request is associated with at least one of:
- a frequent transportation requestor;
- a new transportation requestor;
- a scheduled transportation requestor;
- a shared transportation requestor; and
- a subscription transportation requestor.

4. The computer-implemented method of claim 1, further comprising:
identifying a geographical area that corresponds to the transportation request queue;
evaluating a first potential transportation matching between an additional transportation requestor device and an additional transportation provider device and determining that the potential transportation matching would increase a level of availability of transportation provider devices to match to transportation requests within the geographical area relative to a second potential transportation matching between an additional transportation requestor device and an additional transportation provider device; and
matching the first transportation requestor device and the additional transportation provider device instead of matching the second potential transportation matching between the additional transportation requestor device and the additional transportation provider device based at least in part on determining the effect that the potential transportation matching would have on the level of availability of transportation provider devices and a length of the transportation request queue.

5. The computer-implemented method of claim 1, further comprising:

increasing the priority level assigned to the transportation request based at least in part on a length of time the transportation request has spent in the transportation request queue.

6. The computer-implemented method of claim 1, wherein the priority level assigned to the transportation request designates the transportation request for entry into the transportation request queue based at least in part on a fare associated with the transportation request.

7. The computer-implemented method of claim 6, wherein the fare associated with the transportation request and upon which entry into the transportation request queue is based comprises at least one of a base fare or a premium fare.

8. The computer-implemented method of claim 1, further comprising determining a premium fare amount based at least in part on a length of the transportation request queue.

9. The computer-implemented method of claim 1, wherein, when the transportation provider device is matched to the transportation requestor device and a fare associated with the transportation request is a premium fare, a fare amount based at least in part on the premium fare minus a base fare is added to an escrow account.

10. The computer-implemented method of claim 9, wherein a transportation provider is paid a portion of the fare amount from the escrow account.

11. The computer-implemented method of claim 1, wherein assigning the priority level to the transportation request comprises receiving a selection from the transportation requestor device to enter the transportation request queue instead of attempting to match the transportation requestor device with an available transportation provider device when the transportation requestor device submits the transportation request.

12. A system comprising one or more physical processors and one or more memories coupled to one or more of the physical processors, the one or more memories comprising instructions operable when executed by the one or more physical processors to cause the system to perform operations comprising:
determining a level of availability of transportation provider devices in a dynamic transportation network to match to transportation requests;
assigning a priority level to a transportation request within the dynamic transportation network submitted for a transportation requestor device;
entering the transportation request into a transportation request queue instead of matching the transportation requestor device to an available transportation provider device within the dynamic transportation network based at least in part on the assigned priority level, thereby maintaining a level of availability of transportation provider devices within the dynamic transportation network;
determining that the transportation request has entered the transportation request queue;
determining that matching the transportation request by the dynamic transportation network would maintain the level of availability of transportation provider devices within the dynamic transportation network;
selecting a transportation provider device from among the transportation provider devices; and
matching the selected transportation provider device to the transportation requestor device from the transportation request queue based at least in part on determining that matching the transportation request maintains the level of availability of transportation provider devices within the dynamic transportation network, wherein transportation requests not placed within the transportation request queue are matched before matching transportation requests placed within the transportation request queue based on the transportation requests placed within the transportation request queue being placed within the transportation request queue.

13. The system of claim 12, wherein the priority level assigned to the transportation request is based on at least one of:
   a fare associated with the transportation request;
   a distance from the transportation requestor device to the transportation provider device;
   an estimated time of arrival of the transportation provider device;
   a length of time the transportation request is in the transportation request queue; or
   a type of the transportation request.

14. The system of claim 13, wherein the type of the transportation request is associated with at least one of:
   a frequent transportation requestor;
   a new transportation requestor;
   a scheduled transportation requestor;
   a shared transportation requestor; and
   a subscription transportation requestor.

15. The system of claim 12, further comprising:
   increasing the priority level assigned to the transportation request based at least in part on a length of time the transportation request has spent in the transportation request queue.

16. The system of claim 12, wherein the priority level assigned to the transportation request designates the transportation request for entry into the transportation request queue based at least in part on a fare associated with the transportation request.

17. The system of claim 16, further comprising:
   identifying a geographical area that corresponds to the transportation request queue;
   evaluating a first potential transportation matching between an additional transportation requestor device and an additional transportation provider device and determining that the potential transportation matching would increase a level of availability of transportation provider devices to match to transportation requests within the geographical area relative to a second potential transportation matching between an additional transportation requestor device and an additional transportation provider device; and
   matching the first transportation requestor device and the additional transportation provider device instead of matching the second potential transportation matching between the additional transportation requestor device and the additional transportation provider device based at least in part on determining the effect that the potential transportation matching would have on the level of availability of transportation provider devices and a length of the transportation request queue.

18. The system of claim 12, wherein, when the transportation provider device is matched to the transportation requestor device and a fare associated with the transportation request is a premium fare, a fare amount based at least in part on the premium fare minus a base fare is added to an escrow account.

19. The system of claim 18, wherein a transportation provider is paid a portion of the fare amount from the escrow account.

20. A non-transitory computer-readable storage medium comprising computer-readable instructions that, when executed by at least one processor of a computing device, cause the computing device to:
   determine a level of availability of transportation provider devices in a dynamic transportation network to match to transportation requests;
   assign a priority level to a transportation request within the dynamic transportation network submitted for a transportation requestor device;
   enter the transportation request into a transportation request queue instead of matching the transportation requestor device to an available transportation provider device within the dynamic transportation network based at least in part on the assigned priority level, thereby maintaining a level of availability of transportation provider devices within the dynamic transportation network;
   determine that the transportation request has entered the transportation request queue;
   determine that matching the transportation request by the dynamic transportation network would maintain the level of availability of transportation provider devices within the dynamic transportation network;
   select a transportation provider device from among the transportation provider devices; and
   match the selected transportation provider device to the transportation requestor device from the transportation request queue based at least in part on determining that matching the transportation request maintains the level of availability of transportation provider devices within the dynamic transportation network, wherein transportation requests not placed within the transportation request queue are matched before matching transportation requests placed within the transportation request queue based on the transportation requests placed within the transportation request queue being placed within the transportation request queue.

* * * * *